United States Patent
Sun et al.

(10) Patent No.: US 10,602,489 B2
(45) Date of Patent: Mar. 24, 2020

(54) SELF-CONTAINED UPLINK FOR REDUCED DURATION TRANSMISSION TIME INTERVAL

(71) Applicant: QUALCOMM Incorporated, San Diego, CA (US)

(72) Inventors: Jing Sun, San Diego, CA (US); Wanshi Chen, San Diego, CA (US); Shimman Arvind Patel, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 32 days.

(21) Appl. No.: 15/439,613

(22) Filed: Feb. 22, 2017

(65) Prior Publication Data

US 2017/0289992 A1  Oct. 5, 2017

Related U.S. Application Data

(60) Provisional application No. 62/317,390, filed on Apr. 1, 2016.

(51) Int. Cl.
| | |
|---|---|
| H04W 72/04 | (2009.01) |
| H04L 5/00 | (2006.01) |
| H04W 72/14 | (2009.01) |
| H04W 48/12 | (2009.01) |

(52) U.S. Cl.
CPC ....... H04W 72/0413 (2013.01); H04L 5/0044 (2013.01); H04L 5/0051 (2013.01);
(Continued)

(58) Field of Classification Search
CPC . H04W 72/0413; H04W 48/12; H04W 72/14; H04L 5/0044; H04L 5/0051; H04L 5/0092; H04L 5/0037
(Continued)

(56) References Cited

U.S. PATENT DOCUMENTS

| | | |
|---|---|---|
| 2014/0286255 A1* | 9/2014 | Nam ................ H04L 1/1861 370/329 |
| 2016/0095137 A1 | 3/2016 | Chen et al. |

(Continued)

FOREIGN PATENT DOCUMENTS

| | | |
|---|---|---|
| WO | WO-2017132841 A1 | 8/2017 |

OTHER PUBLICATIONS

ISA/EP, International Search Report and Written Opinion of the International Searching Authority, Int'l Application No. PCT/US2017/019036, dated May 15, 2017, European Patent Office, Rijswijk, NL, 18 pgs.

Qualcomm Incorporated, "TTI Shortening and Reduced Processing Time for UL Transmissions", 3GPP TSG RAN WG1 Meeting #84, R1-160906, St. Julian's, Malta, Feb. 15-29, 2016, 5 pgs., XP051054230, 3rd Generation Partnership Project.

(Continued)

*Primary Examiner* — Obaidul Huq
(74) *Attorney, Agent, or Firm* — Holland & Hart LLP

(57) ABSTRACT

Methods, systems, and devices for wireless communication are described. A user equipment (UE) may receive a resource allocation associated with a low latency time interval (TTI). The low latency TTI may be a two-symbol TTI. The UE may transmit, responsive to the resource allocation, a two-symbol TTI that includes a demodulation reference signal (DM-RS) symbol and a data symbol. In some cases, the two-symbol TTI may precede the transmission of another two-symbol TTI from the same UE that includes data and excludes DM-RS. In some cases, the two-symbol TTI includes DM-RS from another UE. In such cases, data from the other UE may be transmitted in a subsequent two-symbol TTI.

25 Claims, 18 Drawing Sheets

(52) U.S. Cl.
CPC .......... *H04L 5/0092* (2013.01); *H04W 48/12* (2013.01); *H04W 72/14* (2013.01); *H04L 5/0037* (2013.01)

(58) Field of Classification Search
USPC ................................. 370/310, 328, 329, 336
See application file for complete search history.

(56) References Cited

U.S. PATENT DOCUMENTS

| | | | |
|---|---|---|---|
| 2016/0192385 A1* | 6/2016 | Tooher ................. | H04L 5/0051 370/336 |
| 2018/0098337 A1* | 4/2018 | Lee ................... | H04W 72/1205 |
| 2018/0241524 A1* | 8/2018 | Andersson ............ | H04L 5/0032 |
| 2019/0037554 A1* | 1/2019 | Gao ...................... | H04L 5/0051 |

OTHER PUBLICATIONS

ZTE, "L1 Considerations on Latency Reduction", 3GPP TSG RAN WG1 Meeting #83, R1-157151, Anaheim, USA, Nov. 15-22, 2015, 6 pgs., XP051003410, 3rd Generation Partnership Project.

Huawei et al., "Short TTI for UL Transmissions", 3GPP Draft; R1-160294, 3rd Generation Partnership Project (3GPP), Mobile Competence Centre, 650, Route Des Lucioles, F-06921 Sophia-Antipolis Cedex, France, vol. RAN WG1, No. St Julian's, Malta; 20160215-20160219 Feb. 6, 2016, XP051064112, Retrieved from the Internet: URL:http://www.3gpp.org/ftp/tsg_ran/WG1_RL1/TSGR1_84/Docs/ [retrieved on Feb. 6, 2016], 4 pages.

* cited by examiner

SELF-CONTAINED UPLINK FOR REDUCED DURATION TRANSMISSION TIME INTERVAL

CROSS REFERENCES

The present application for patent claims priority to U.S. Provisional Patent Application No. 62/317,390 entitled "Self-Contained Uplink For Reduced Duration Transmission Time Interval," filed Apr. 1, 2016, assigned to the assignee hereof.

BACKGROUND

The following relates generally to wireless communication, and more specifically to self-contained uplink for reduced duration transmission time intervals (TTIs).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may be otherwise known as user equipment (UE).

Wireless multiple-access technologies have been adopted in various telecommunication standards to provide a common protocol that enables different wireless devices to communicate on a municipal, national, regional, and even global level. An example telecommunication standard is Long Term Evolution (LTE). LTE is designed to improve spectral efficiency, lower costs, improve services, make use of new spectrum, and better integrate with other open standards. LTE may use OFDMA on the downlink (DL), single-carrier frequency division multiple access (SC-FDMA) on the uplink (UL), and multiple-input multiple-output (MIMO) antenna technology.

A base station and a UE in a system employing multiple-access technology may operate according to a low latency physical (PHY) layer timing structure. Low latency operations (for example, operations based on a reduced transmission time interval (TTI)) may provide for reduced delay between a transmission and a HARQ response, for example. Low latency operation may, however, introduce issues related to receiving various transmissions relative other transmissions, and low latency scheduling may affect device operation, such as demodulation, in either the uplink or downlink.

SUMMARY

A user equipment (UE) may receive an uplink resource allocation associated with low latency, two-symbol transmission time intervals (TTIs). The uplink resource allocation may schedule the UE for transmission of demodulation reference signals (DM-RS) or data, or both, during two-symbol TTIs. Including the DM-RS in the two-symbol TTI with data may facilitate demodulation by a base station. The UE may, based on the uplink resource allocation, determine whether a DM-RS is to be transmitted in a symbol of the two-symbol TTI. In some cases, the UE may transmit the DM-RS in a first symbol of the two-symbol TTI and transmit data in a second symbol of the two-symbol TTI. In such a scenario, the UE may transmit a subsequent two-symbol TTI that includes two symbols of data. In some cases, the first symbol conveying the DM-RS of the UE may also convey DM-RS of another UE. The second symbol of the two-symbol TTI may include data from one of the UEs and the two symbols of a subsequent two-symbol TTI may include data from the other UE.

A method of wireless communication is described. The method may include receiving an uplink resource allocation that is associated with a two-symbol TTI and determining whether a DM-RS is scheduled to be transmitted in one symbol of the two-symbol TTI as part of the uplink resource allocation. The method may include transmitting data or the DM-RS, or both, during the two-symbol TTI based at least in part on the determination of whether the DM-RS is scheduled.

An apparatus for wireless communication is described. The apparatus may include means for receiving an uplink resource allocation that is associated with a two-symbol TTI and means for determining whether a DM-RS is scheduled to be transmitted in one symbol of the two-symbol TTI as part of the uplink resource allocation. The apparatus may include means for transmitting data or the DM-RS, or both, during the two-symbol TTI based at least in part on the determination of whether the DM-RS is scheduled.

A further apparatus is described. The apparatus may include a processor, memory in electronic communication with the processor, and instructions stored in the memory. The instructions may be operable to cause the processor to receive an uplink resource allocation that is associated with a two-symbol TTI and determine whether a DM-RS is scheduled to be transmitted in one symbol of the two-symbol TTI as part of the uplink resource allocation. The instructions may be operable to cause the processor to transmit data or the DM-RS, or both, during the two-symbol TTI based at least in part on the determination of whether the DM-RS is scheduled.

A non-transitory computer readable medium for wireless communication is described. The non-transitory computer-readable medium may include instructions to cause a processor to receive an uplink resource allocation that is associated with a two-symbol TTI and determine whether a DM-RS is scheduled to be transmitted in one symbol of the two-symbol TTI as part of the uplink resource allocation. The non-transitory computer-readable medium may include instructions to cause the processor to transmit data or the DM-RS, or both, during the two-symbol TTI based on the determination of whether the DM-RS is scheduled.

Some examples of the method, apparatus, or non-transitory computer-readable medium described above may further include processes, features, means, or instructions for determining that the DM-RS is scheduled, wherein the DM-RS and the data are transmitted during the two-symbol TTI, and transmitting additional data during a subsequent TTI, wherein the subsequent TTI excludes another DM-RS. In some cases, the number of symbol periods between the symbol with the DM-RS and the subsequent TTI is an odd number. In some cases, transmitting the data or the DM-RS, or both, includes transmitting the DM-RS during a first symbol of the two-symbol TTI and transmitting the data during a second symbol of the two-symbol TTI. In some cases, transmitting the data or the DM-RS, or both, includes transmitting the DM-RS during a first symbol of the two-symbol TTI and refraining from transmitting during a second symbol of the two-symbol TTI, wherein resources of the second symbol TTI are available for communications by another device.

In some examples, the first symbol of the two-symbol TTI comprises DM-RS transmissions from two or more UEs. Some examples of the method, apparatus, or non-transitory computer-readable medium described above may further include processes, features, means, or instructions for transmitting data during a subsequent TTI that excludes another DM-RS. In some cases, the uplink resource allocation is received in a downlink control channel during a prior two-symbol TTI. In some examples, the uplink resource allocation is received in a downlink control channel of during TTI that has a longer duration than the two-symbol TTI.

A method of wireless communication is described. The method may include transmitting an uplink resource allocation that is associated with a two-symbol TTI and determining whether a DM-RS is scheduled to be transmitted in one symbol of the two-symbol TTI as part of the uplink resource allocation. The method may include receiving data or the DM-RS, or both, during the two-symbol TTI based at least in part on the determination of whether the DM-RS is scheduled.

An apparatus for wireless communication is described. The apparatus may include means for transmitting an uplink resource allocation that is associated with a two-symbol TTI and means for determining whether a DM-RS is scheduled to be transmitted in one symbol of the two-symbol TTI as part of the uplink resource allocation. The apparatus may include means for receiving data or the DM-RS, or both, during the two-symbol TTI based at least in part on the determination of whether the DM-RS is scheduled.

A further apparatus is described. The apparatus may include a processor, memory in electronic communication with the processor, and instructions stored in the memory. The instructions may be operable to cause the processor to transmit an uplink resource allocation that is associated with a two-symbol TTI and determine whether a DM-RS is scheduled to be transmitted in one symbol of the two-symbol TTI as part of the uplink resource allocation. The instructions may be operable to cause the processor to receive data or the DM-RS, or both, during the two-symbol TTI based at least in part on the determination of whether the DM-RS is scheduled.

A non-transitory computer readable medium for wireless communication is described. The non-transitory computer-readable medium may include instructions to cause a processor to transmit an uplink resource allocation that is associated with a two-symbol TTI and determine whether a DM-RS is scheduled to be transmitted in one symbol of the two-symbol TTI as part of the uplink resource allocation. The non-transitory computer-readable medium may include instructions to cause the processor to receive data or the DM-RS, or both, during the two-symbol TTI based on the determination of whether the DM-RS is scheduled.

Some examples of the method, apparatus, or non-transitory computer-readable medium described above may further include processes, features, means, or instructions for determining that the DM-RS is scheduled, wherein the DM-RS and the data are received during the two-symbol TTI and receiving additional data during a subsequent TTI, wherein the subsequent TTI excludes another DM-RS. In some cases, receiving the data or the DM-RS, or both, includes receiving the DM-RS during a first symbol of the two-symbol TTI and receiving the data during a second symbol of the two-symbol TTI. In some examples, receiving the data or the DM-RS, or both, includes receiving the DM-RS during a first symbol of the two-symbol TTI, wherein the DM-RS is associated with a first UE and receiving another DM-RS during the first symbol of the two-symbol TTI, wherein the other DM-RS is associated with a second UE. In some examples, the method, apparatus, or non-transitory computer-readable medium described above may further include processes, features, means, or instructions for receiving data from the second UE during a second symbol of the two-symbol TTI and receiving data from the first UE during a subsequent TTI that excludes another DM-RS.

DETAILED DESCRIPTION

In some cases, a wireless system may utilize low latency operations. This may be achieved by using a reduced transmission time interval (TTI) as compared with other TTIs in the system or communication schemes. A Long Term Evolution (LTE) system, for instance, utilizes a TTI of 1 ms duration, which is referred to as a subframe and which, as discussed below, may include time divisions referred to as symbols or symbol periods. But low latency operations may be employed via TTIs that have a substantially shorter duration than an LTE subframe. A low latency TTI may be just one or two symbols in duration, for example. These low latency TTIs may be scheduled to coexist or complement longer duration TTIs.

In some cases, a low latency uplink TTI (e.g., a two-symbol TTI) may include one or more symbols of that include data transmission. For instance, the data may be transmitted in physical uplink control channel (PUSCH), which, as discussed below may be referred to as a low latency, short, or self-contained PUSCH (sPUSCH). According to the techniques described herein, the low latency TTI conveying sPUSCH may be preceded by another low latency TTI (e.g., a two-symbol TTI) or symbol of a low latency TTI (e.g., one symbol of a two-symbol TTI) conveying a demodulation reference signal (DM-RS), which may be used in the demodulation of the sPUSCH. So in some cases, the low latency TTI conveying sPUSCH may also include the DM-RS. Thus, the low latency TTI may be self-contained in that it may include both data and signaling used to facilitate demodulation of the data. In some cases, a single DM-RS symbol in a low latency TTI may be transmitted for multiple sPUSCH symbols from the same user equipment (UE). In some examples, a single DM-RS symbol in a low latency TTI may convey DM-RS for multiple UEs and may precede sPUSCH symbols (in the same or different low latency TTIs) corresponding to each of the UEs.

Aspects of this disclosure introduced above are described below in the context of a wireless communication system. Specific examples are then described for various low latency transmission techniques for DM-RS are described. Additionally, specific examples for self-contained DM-RS transmissions are described. These and other aspects of the disclosure are further illustrated by and described with reference to apparatus diagrams, system diagrams, and flowcharts.

Figure 1:
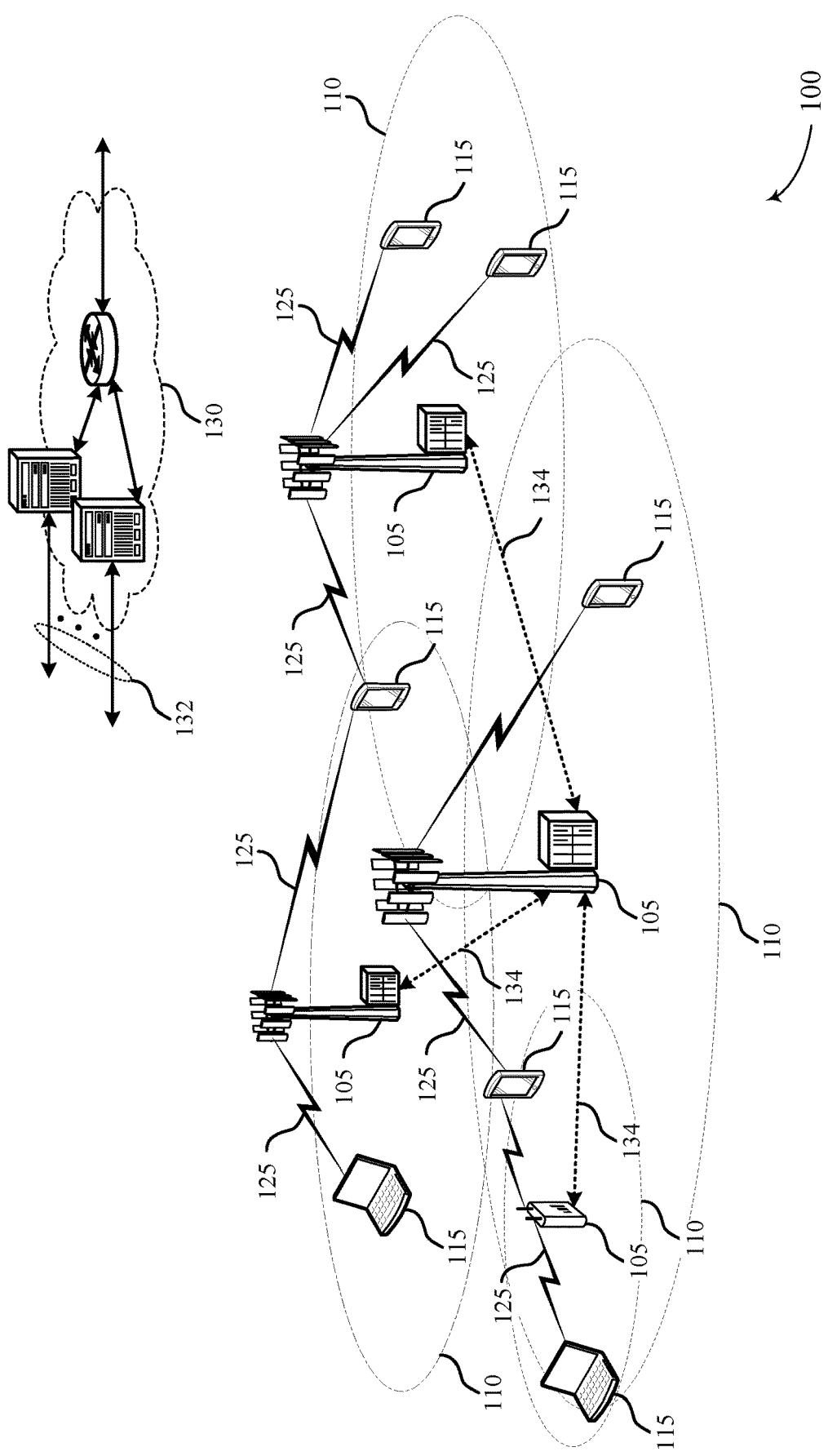
FIG. 1 illustrates an example of a wireless communications system that supports self-contained uplink for reduced duration transmission time intervals (TTIs) in accordance with aspects of the present disclosure.

FIG. 1 illustrates an example of a wireless communications system 100 that supports self-contained uplink for reduced duration transmission time intervals in accordance with various aspects of the present disclosure. The wireless communications system 100 includes base stations 105, UEs 115, and a core network 130. In some examples, the wireless communications system 100 may be an LTE or LTE-Advanced (LTE-A) network.

The base stations 105 may wirelessly communicate with the UEs 115 via one or more base station antennas. Each of the base stations 105 may provide communication coverage for a respective geographic coverage area 110. The communication links 125 shown in wireless communications system 100 may include uplink (UL) transmissions from a UE 115 to a base station 105, or downlink (DL) transmissions, from a base station 105 to a UE 115. In some cases, wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may thus be configured with multiple downlink CCs and one or more uplink CCs for carrier aggregation. Carrier aggregation may be used with both frequency division duplexed (FDD) and time division duplexed (TDD) component carriers.

The base stations 105 may interface with the core network 130 through backhaul links 132 (e.g., S1, etc.). The base stations 105 may also communicate with one another over backhaul links 134 (e.g., X1, etc.) either directly or indirectly (e.g., through core network 130). In some cases, base stations 105 may perform radio configuration and scheduling for communication with the UEs 115, or may operate under the control of a base station controller (not shown). In various examples, base stations 105 may be macro cells, small cells, hot spots, or the like. The base stations 105 may also be referred to as eNodeBs (eNBs) 105 in some examples. The base stations 105 may support and may utilize low latency operations (e.g., two-symbol TTIs) to facilitate faster processing of certain delay intolerant communications with low latency capable UEs 115.

Time intervals in LTE may be expressed in multiples of a basic time unit (e.g., the sampling period, $T_s=1/30{,}720{,}000$ seconds). Time resources may be organized according to radio frames of length of 10 ms ($T_f=307200 \cdot T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe (e.g., the TTI may be two symbols) or may be dynamically selected (e.g., in short TTI bursts or in selected component carriers using short TTIs).

The communication networks that may accommodate some of the various disclosed examples, including wireless communications system 100 of FIG. 1, may be packet-based networks that operate according to a layered protocol stack and data in the user plane may be based on Internet protocol (IP). A radio link control (RLC) layer may perform packet segmentation and reassembly to communicate over logical channels. A medium access control (MAC) layer may perform priority handling and multiplexing of logical channels into transport channels. The MAC layer may also use hybrid automatic repeat request (HARD) to provide retransmission at the MAC layer to improve link efficiency. In the control plane, the radio resource control (RRC) protocol layer may provide establishment, configuration, and maintenance of an RRC connection between a UE 115 and the base stations 105. In some cases, RRC signaling may be utilized to signal DM-RS patterns, including low latency DM-RS patterns, and carrier configurations to UEs 115. The RRC protocol layer may also be used for core network 130 support of radio bearers for the user plane data.

Data may be divided into logical channels, transport channels, and physical layer channels. Channels may also be classified into Control Channels and Traffic Channels. DL physical channels may, for example, include physical broadcast channel (PBCH) for broadcast information, physical control format indicator channel (PCFICH) for control format information, physical downlink control channel (PDCCH) for control and scheduling information, physical HARQ indicator channel (PHICH) for HARQ status messages, physical downlink shared channel (PDSCH) for user data and physical multicast channel (PMCH) for multicast data. UL physical channels may include physical random access channel (PRACH) for access messages, physical uplink control channel (PUCCH) for control data, and physical uplink shared channel (PUSCH) for user data. In some cases, additional low latency physical channels may be employed to support low latency operations. These may include a low latency PDCCH (sPDCCH) and low latency PDSCH (sPDSCH) in the downlink and low latency PUCCH (sPUCCH) and low latency PUSCH (sPUSCH) in the uplink.

PDCCH may carry downlink control information (DCI) in control channel elements (CCEs), which may consist of nine logically contiguous resource element groups (REGs), where each REG contains 4 resource elements (REs). Likewise, uPDCCH may carry DCI in low latency CCEs (uCCEs), which may consist of low latency REGs (uREGs). DCI includes information regarding DL scheduling assignments, UL resource grants, transmission scheme, UL power control, HARQ information, modulation and coding scheme (MCS) and other information. The size and format of the DCI messages can differ depending on the type and amount of information that is carried by the DCI. For example, if spatial multiplexing is supported, the size of the DCI message is large compared to contiguous frequency allocations. Similarly, for a system such as wireless communications system 100 that employs Multiple Input Multiple Output (MIMO), the DCI may also include additional signaling information. DCI size and format may depend on the amount of information as well as factors such as bandwidth, the number of antenna ports, and duplexing mode being utilized. The size and format of the DCI may determine the number of resources a wireless communications system 100 allocates to the PDCCH or sPDCCH.

The wireless communications system 100 may transmit control information on the PDCCH corresponding to a legacy downlink or uplink transmission. The control information may be used by a UE 115 to determine a resource allocation in a following subframe. For instance, a legacy UE 115 may determine a reference signal pattern, what resources are allocated to the PDSCH, and the like for the subframe. The system may additionally transmit a sPDCCH that communicates similar control information corresponding to a low latency transmission, which a low latency UE 115 may use to determine a low-latency resource allocation. A low latency UE 115 may, for instance, determine that a low latency TTI (e.g., a two-symbol TTI) is scheduled and determine resources that are allocated to sPUSCH and DM-RS during the low latency TTI. For example, a UE 115 may receive an uplink grant (e.g., conveyed by sPDCCH) that indicates to the UE 115 that a two-symbol TTI is to be transmitted that includes both data (e.g., conveyed by sPUSCH) and DM-RS. Thus, a UE 115 may receive an uplink resource allocation via a downlink control channel (e.g., sPDCCH) that is associated with two-symbol TTIs.

Figure 2:
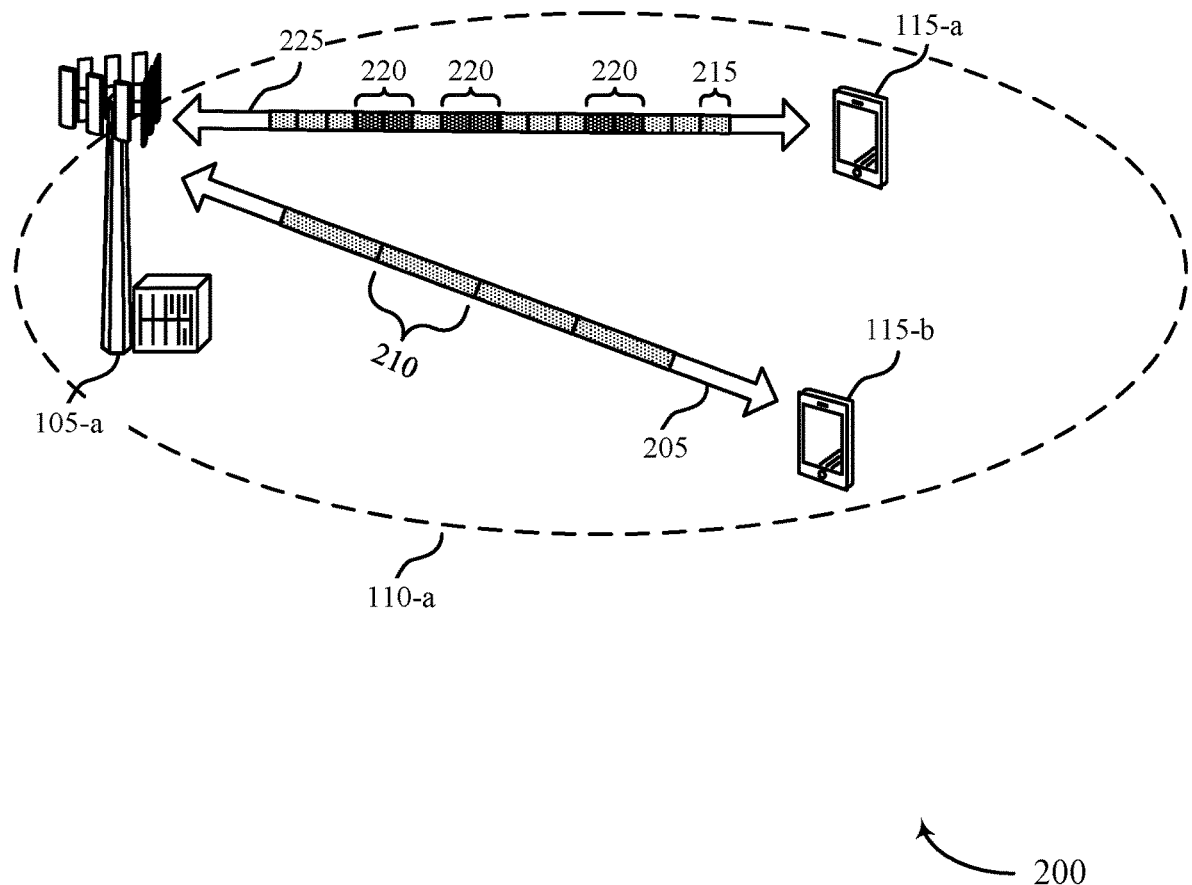
FIG. 2 illustrates an example of a wireless communications system that supports self-contained uplink for reduced duration TTIs in accordance with aspects of the present disclosure.

FIG. 2 illustrates an example of a wireless communications system 200 that supports self-contained uplink for reduced duration transmission time intervals in accordance with various aspects of the present disclosure. Wireless communications system 200 may include UE 115-a, UE 115-b, and base station 105-a, which may be examples of a UE 115 or a base station 105 described above with reference to FIG. 1. Base station 105-a may communicate with UE 115-b via communication link 205, which may utilize legacy TTIs 210, and with UE 115-a via communications link 225, which may utilize low latency TTIs 215 and 220, when the UEs 115 are within geographic coverage area 110-a, as generally described above with reference to FIG. 1. Low latency TTIs 220 may be two-symbol TTIs as described herein.

The UEs 115 may transmit DM-RS to base station 105-a. The DM-RS from a UE 115 may be used by base station 105-a to equalize and demodulate transmissions from that particular UE 115. For example, DM-RS from UE 115-a may be used by base station 105-a to demodulate data transmissions (e.g., conveyed by sPUSCH) from UE 115-a. In some cases, a UE 115 may send DM-RS in a two-symbol TTI (e.g., two-symbol TTI 220) that also includes data (e.g., sPUSCH). In some cases, the DM-RS may be used for subsequent data transmissions from that UE 115. Also on the uplink, a UE 115 may transmit a periodic sounding reference signal (SRS) for link adaptation.

Figure 3:
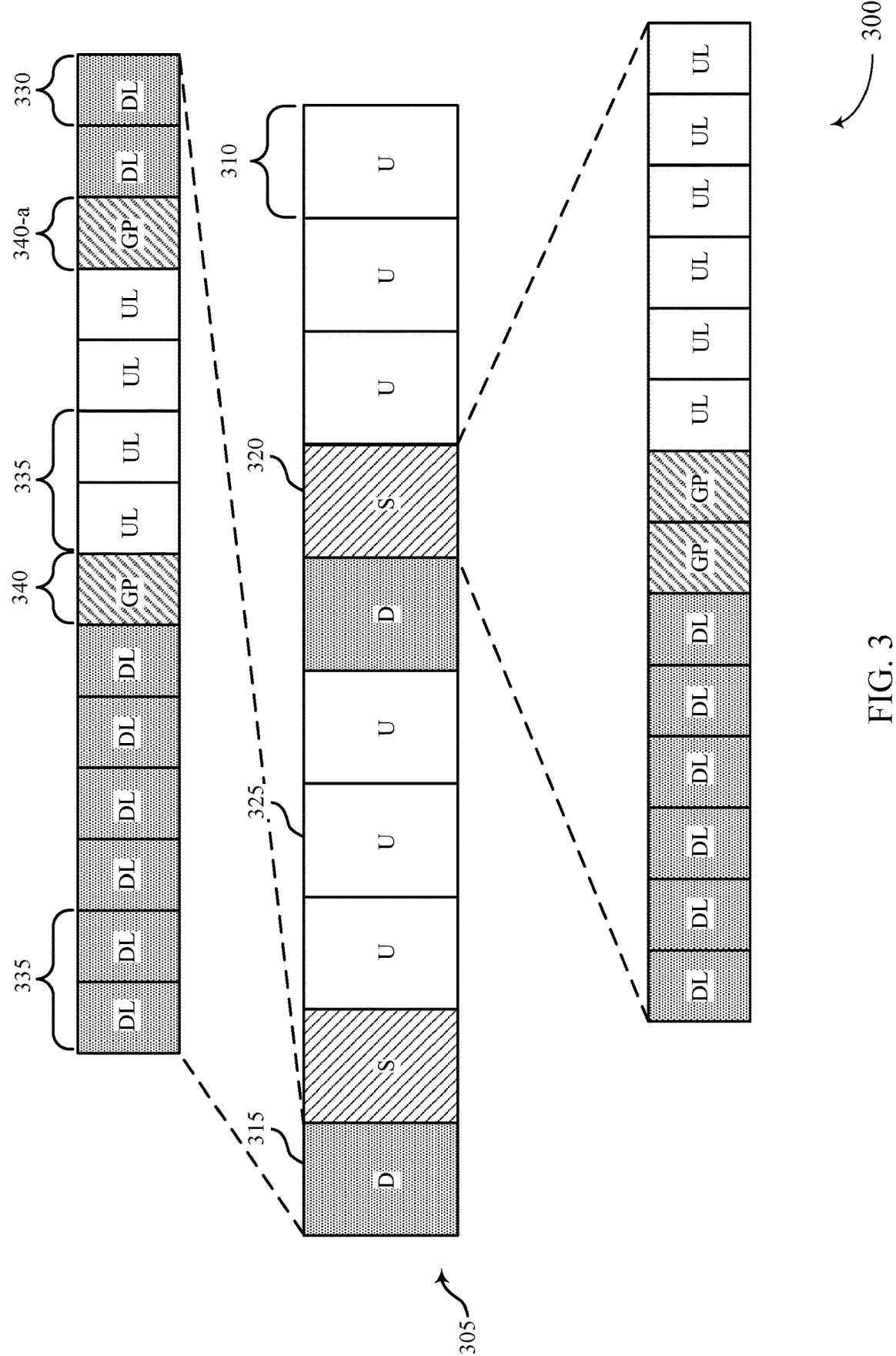
FIG. 3 illustrates an example of a frame configuration that supports self-contained uplink for reduced duration TTIs in accordance with aspects of the present disclosure.

A frame structure may be used within the wireless communications system 200 to organize physical resources. A frame may be a 10 ms interval that may be further divided into 10 equally sized subframes, as depicted in FIG. 3. Each subframe may include two consecutive time slots. Each slot may include 6 or 7 OFDMA symbol periods. A resource element consists of one symbol period and one subcarrier (a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be for the UE.

In some cases, and as discussed above, an LTE subframe, such as TTI 210, may be the smallest scheduling unit, also known as a TTI. In other cases, a TTI may be shorter than a subframe or may be dynamically selected (e.g., in short TTI bursts or in selected component carriers using short TTIs). Wireless communications system 200 may employ TTIs of varying lengths to communicate with low latency and legacy UEs 115. For low latency or low latency operation, TTIs with short durations, such as two-symbol TTI 220, may be employed. In some cases, using shorter length TTIs may reduce over-the-air latency. For example, one-symbol TTI 215 or two-symbol TTIs 220, which may have a duration of one and two LTE symbol periods, respectively, may help reduce HARQ latency as compared with legacy TTIs 210 (e.g., an LTE subframe). Such latency gains may be realized while maintaining compatibility with legacy operation because wireless communications system 200 may utilize LTE numerology for low latency operation such that the two-symbol TTI duration may be different while tone spacing and symbol duration may be the same. That is, a two-symbol TTI configuration may use the same tone spacing (e.g., 15 kHz) and symbol duration (e.g., approximately 71 µs for a normal CP) as a legacy TTI configuration.

FIG. 3 illustrates an example of a frame configuration 300 for self-contained uplink for reduced duration transmission time intervals in accordance with various aspects of the present disclosure. Frame configuration 300 may illustrate aspects of a transmission between a UE 115, such as low latency or legacy UE 115, and a base station 105, as described above with reference to FIGS. 1 and 2. Frame configuration 300 may include a frame 305, which may include a number of low latency subframes 310 scheduled for downlink or uplink. Low latency subframes 310 may be examples of legacy TTIs 210 as described with reference to FIG. 2. In some case, transmissions using frame 305 may be configured to support low latency operation using short duration TTIs. Frame 305 may be used in a FDD or TDD system.

Frame 305 may include a number of subframes configured as low latency downlink subframes 315 and low latency uplink subframes 325. In some cases, frame 305 may include both low latency subframes and non-low latency subframes. The distribution of low latency downlink subframes 315 and low latency uplink subframes 325 may be determined by a base station 105 according to predefined uplink/downlink TDD configurations, for example. Between the low latency downlink subframes 315 and the low latency uplink subframes 325, the base station may not schedule any information. Such scheduling gaps may allow a UE 115 to transition from a downlink setup to an uplink setup. Thus, frame 305 may include special subframes 320 which act as guard periods for occasions when communication direction changes (e.g., from downlink to uplink).

Low latency subframes 310 may be partitioned into smaller segments—that is, larger TTIs, such as subframes, may include smaller TTIs, such as two-symbol TTIs 335. For example, low latency subframes 310 may include a number of low latency symbols 330. Two low latency symbols 330 may be combined to form a two-symbol TTI 335. A two-symbol TTI may be scheduled to convey downlink data (e.g., downlink symbols) or uplink data (e.g., uplink symbols such as sPUSCH and DM-RS symbols). In some low-latency configurations, a base station 105 may schedule the low latency symbols 330 of a low latency subframe 310 according to the same or different direction as a low latency subframe 310. A HARQ process may be performed at the symbol-level (e.g., within a low latency subframe 310). Two-symbol TTIs may allow a system to, in the UL, more readily implement frequency hopping while maintaining a single carrier waveform (e.g., an approximation of an SC-FDM waveform).

In some cases, a base station 105 may schedule gaps between communication direction changes at the symbol-level (e.g., the gaps may be within a low latency subframe 310). For example, a base station 105 may schedule guard periods 340 and 340-a, which may allow a low latency UE 115 to change configurations.

A base station 105 may use control signaling to support different TTI configurations or to support low latency operation. For instance, a base station 105 may signal to a low latency UE 115 which two-symbol TTIs 335 are for uplink. In response, the UE 115 may include DM-RS symbols in the same or a prior TTI. The UE 115 may also include data (e.g., sPUSCH) in the same or a prior TTI. The base station 105 may schedule TTIs based on two symbol intervals, such as DL or UL two-symbol TTIs 335. In some cases, a base station 105 may signal a DM-RS trigger that alerts a UE 115 that DM-RS is to be sent with, or prior to, data (e.g., sPUSCH). Absence of the DM-RS trigger may indicate to a UE 115 that DM-RS is not to be sent with the data. In some cases, a base station 105 may also signal a DM-RS offset. Both the DM-RS trigger and the DM-RS offset may be included in an uplink grant. The DM-RS trigger may be a bit and the DM-RS offset may be a field.

The location of the uplink grant may point to an uplink two-symbol TTI location. For example, if the uplink grant is in two-symbol TTI N and if the uplink grant points to N+4, the uplink two-symbol TTI may be transmitted in two-symbol TTI N+4. In such a scenario, the DM-RS trigger may indicate if there is a DM-RS transmission in the first symbol in two-symbol TTI N+4. The DM-RS offset may be an additional delay in two-symbol TTI transmissions. For example, if the DM-RS offset is zero, the data may be transmitted in two-symbol TTI N+4. If the DM-RS offset is x, then the data may be transmitted in TTI N+4+x. Thus, if DM-RS is triggered and the DM-RS offset is zero, the DM-RS and data will be transmitted in the same two-symbol TTI. In that case, the DM-RS will be transmitted in the first symbol and the data (e.g., sPUSCH) will be transmitted in the remaining symbol. If the DM-RS is not triggered, or the DM-RS offset is non-zero, then the data (e.g., sPUSCH) may be transmitted in a later two-symbol TTI than the DM-RS (e.g., the data will be transmitted in both symbols of a two-symbol TTI). In the case where data (e.g., uPUSCH) is transmitted in two-symbol TTI N+4+x, a retransmission uplink grant may be transmitted in two-symbol TTI N+4+x+4 (assuming it takes 4 two-symbol TTIs to process the uPUSCH).

Figure 4A:
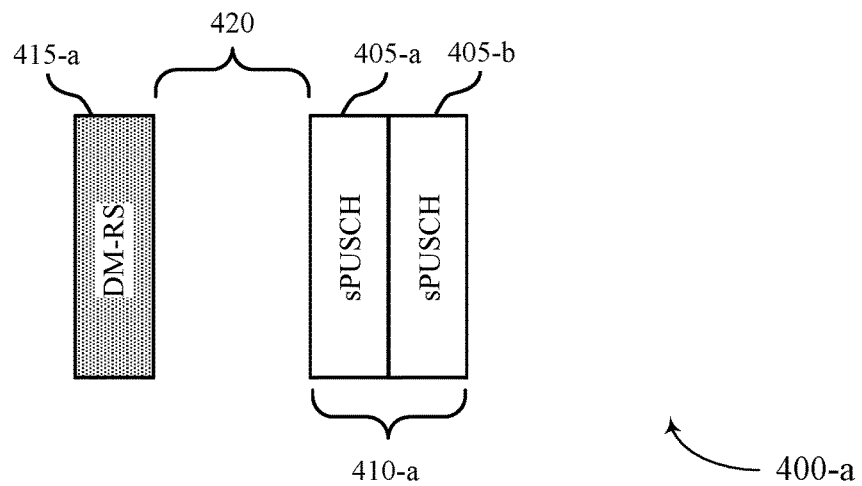
FIGS. 4A-4C illustrate examples of uplink transmissions that support self-contained uplink for reduced duration TTIs in accordance with aspects of the present disclosure.
Figure 4B:
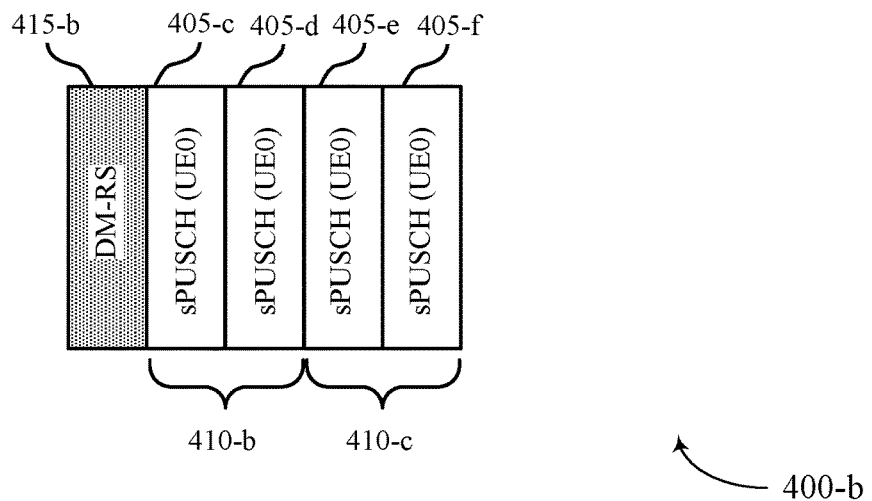
Figure 4C:
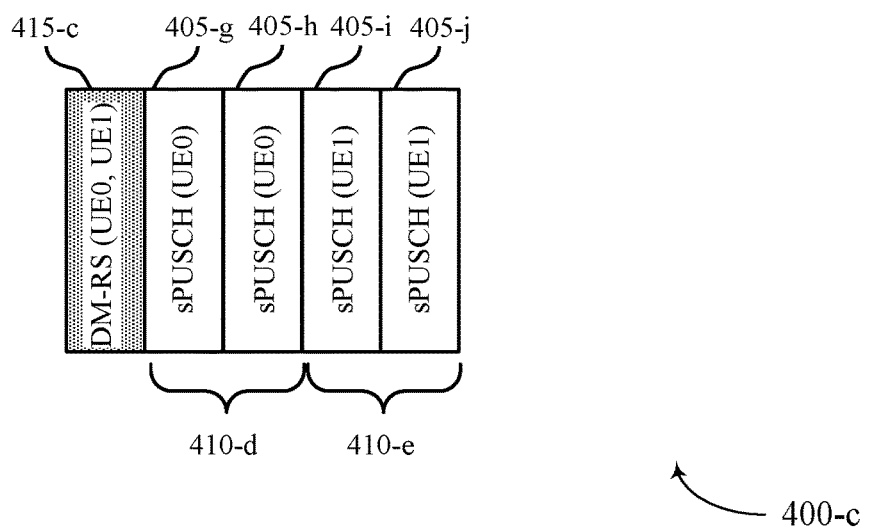

FIGS. 4A, 4B, and 4C illustrate examples of uplink transmissions 400-a, 400-b, and 400-c that support self-contained uplink for reduced duration transmission time intervals in accordance with various aspects of the present disclosure. Uplink transmissions 400-a, 400-b, and 400-c may illustrate aspects of an uplink transmission between a UE 115, such as a low latency UE 115, and a base station 105, as described above with reference to FIGS. 1-3. Uplink transmissions 400 may be part of a frame 305 such as described in FIG. 3 and may include two-symbol TTIs 410. In a wireless communications system that uses two-symbol TTIs, there may be one DM-RS symbol (e.g., a DM-RS symbol 415) and two sPUSCH symbols (e.g., sPUSCH symbols 405) per uplink transmission (e.g., uplink transmissions 400). The DM-RS symbol may be transmitted before the sPUSCH symbols to relax (e.g., lengthen) the decoding time. In some cases, DM-RS may be reused for a UE 115 that transmits sPUSCH continuously or frequently. In some examples, overlapping DM-RS with different cyclic shifts may be used to separate DM-RS from different UEs 115 when multiple UEs 115 transmit sPUSCH. That is, cyclic prefix shifting may be used to distinguish DM-RS that are sent by multiple UEs 115 in the same symbol of a two-symbol TTI.

Uplink transmission 400-a may include a DM-RS symbol 415-a that is transmitted before sPUSCH symbol 405-a and sPUSCH symbol 405-b. The DM-RS symbol 415-a and sPUSCH symbols 405-a and 405-b may be transmitted by the same UE 115. The DM-RS symbol 415-a may be separated from another DM-RS symbol (e.g., from another UE 115) via cyclic shifting. In some cases, a configurable delay 420 may be introduced between the DM-RS symbol 415-a and the sPUSCH symbols 405. The configurable delay may be a number of symbol periods, or two-symbol TTIs periods, between a symbol with the DM-RS and the subsequent TTI. The number of symbol periods may include an even or odd integer number. The configurable delay 420 may temporally position the DM-RS symbol 415-a in an even or odd symbol in a 2-symbol TTI. Thus, two DM-RS symbols may be separated via cyclic shifting and/or via time division multiplexing (TDM) (e.g., temporally).

In some cases, as is shown in FIG. 4B, a DM-RS trigger (e.g., sent in a downlink control message such as an uplink grant) may be used to suppress the DM-RS transmission when a UE 115 has repeated sPUSCH transmissions. For example, a UE 115 (e.g., UE0) may be scheduled to transmit sPUSCH in two consecutive two-symbol TTIs 410. In such a scenario, a DM-RS symbol 415-b may be transmitted before the first two-symbol TTI transmission (e.g., two-symbol TTI 410-b, which may include sPUSCH symbol 405-c and sPUSCH symbol 405-d). Because the DM-RS symbol 415-b has already been transmitted, there may not be a DM-RS trigger for the second two-symbol TTI transmission (e.g., two-symbol TTI 410-c, which may include sPUSCH symbol 405-e and sPUSCH symbol 405-f). Therefore, the UE 115 may refrain from transmitting a second DM-RS symbol and DM-RS symbol 415-b may be used for both two-symbol TTI transmissions (e.g., two-symbol TTI 410-b and two-symbol TTI 410-c). Using a single DM-RS symbol for multiple two-symbol TTI transmissions may reduce overhead and increase system efficiency.

In some examples, multiple UEs 115 may be scheduled to transmit data (e.g., sPUSCH). In such cases, the configurable delay 420 between DM-RS and sPUSCH can be used to position the DM-RS for the respective UEs 115 so that they overlap. The configurable delay 420 may also be used to separate the respective sPUSCHs. An example of such a transmission scheme is shown in FIG. 4C. In such cases, two UEs 115 (e.g., UE0 and UE1) may be scheduled for sPUSCH. As shown by uplink transmission 400-c, the two UEs 115 may share a single DM-RS symbol 415-c. One of the UEs 115 (e.g., UE0) may be granted (e.g., via uplink resource scheduling conveyed by sPDCCH) a configurable delay equal to zero (e.g. symbol periods) so that the sPUSCH symbols for the UE 115 (e.g., sPUSCH symbol 405-g and sPUSCH symbol 405-h which may be included in two-symbol TTI 410-d) are transmitted in the two symbols immediately after the DM-RS symbol 415-c. The other scheduled UE 115 (e.g., UE1) may be granted a configurable delay equal to two (e.g., two symbol periods) so that the sPUSCH symbols for the UE 115 (e.g., sPUSCH symbol 405-i and sPUSCH symbol 405-j, which may be included in two-symbol TTI 410-e) are transmitted in the third and fourth symbols after DM-RS symbol 415-c. Thus, a UE 115 may refrain from transmitting sPUSCH in certain symbols or two-symbol TTIs based on the configurable delay assigned to that UE 115.

In some cases, a DM-RS symbol 415 may be included in a two-symbol TTI (e.g., the two-symbol TTI may be self-containing). A self-containing two-symbol TTI may reduce latency and overhead compared to a two-symbol TTI that is not self-containing. Examples of uplink transmissions associated with self-containing two-symbol TTIs are depicted in FIGS. 5A-5E. FIGS. 5A, 5B, 5C, 5D, and 5E illustrate examples of uplink transmissions 500-a, 500-b, 500-c, 500-d and 500-e that support self-contained uplink for reduced duration transmission time intervals in accordance with various aspects of the present disclosure. Uplink transmissions 500-a, 500-b, 500-c, 500-d, and 500-e may illustrate aspects of an uplink transmission between a UE 115, such as a low latency UE 115, and a base station 105, as described above with reference to FIGS. 1-3. Uplink transmissions 500 may include two-symbol TTIs 510. In a wireless communications system that uses two-symbol TTIs, there may be one DM-RS symbol (e.g., a DM-RS symbol 515) and one sPUSCH symbol (e.g., sPUSCH symbols 505) per two-symbol TTI (e.g., two-symbol TTI 510). Alternatively, a two-symbol TTI may include sPUSCHs and no DM-RS (e.g., if there is not DM-RS trigger associated with the two-symbol TTI). In another example, DM-RS for multiple UEs 115 may be included in a two-symbol TTI (e.g., in one of the symbols of the two-symbol TTI).

Figure 5A:
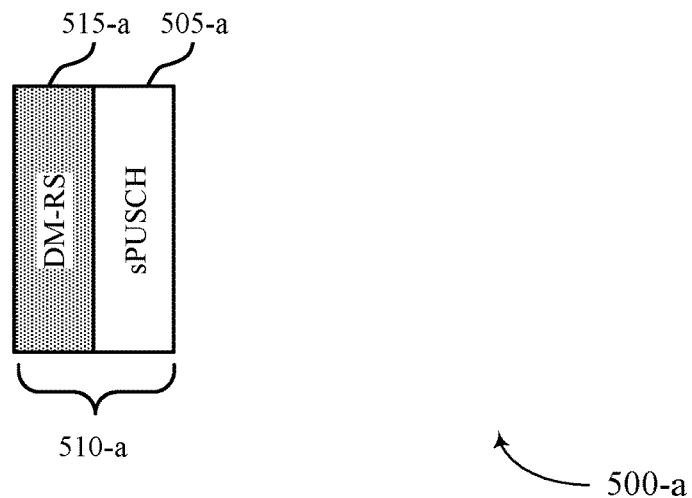
FIGS. 5A-5E illustrate examples of uplink transmissions that support self-contained uplink for reduced duration TTIs in accordance with aspects of the present disclosure.
Figure 5B:
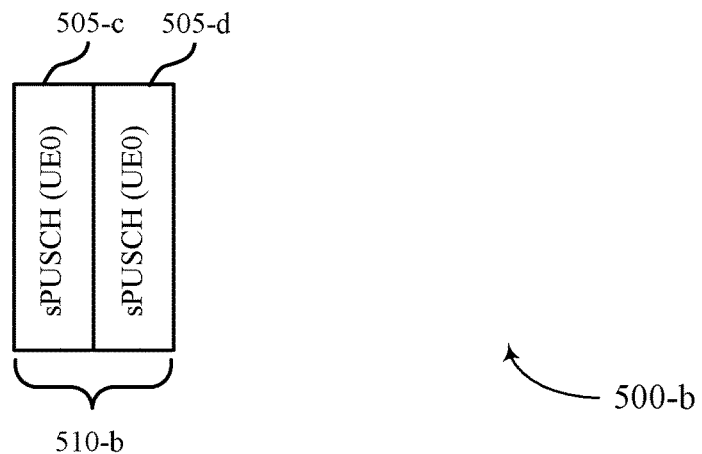
Figure 5C:
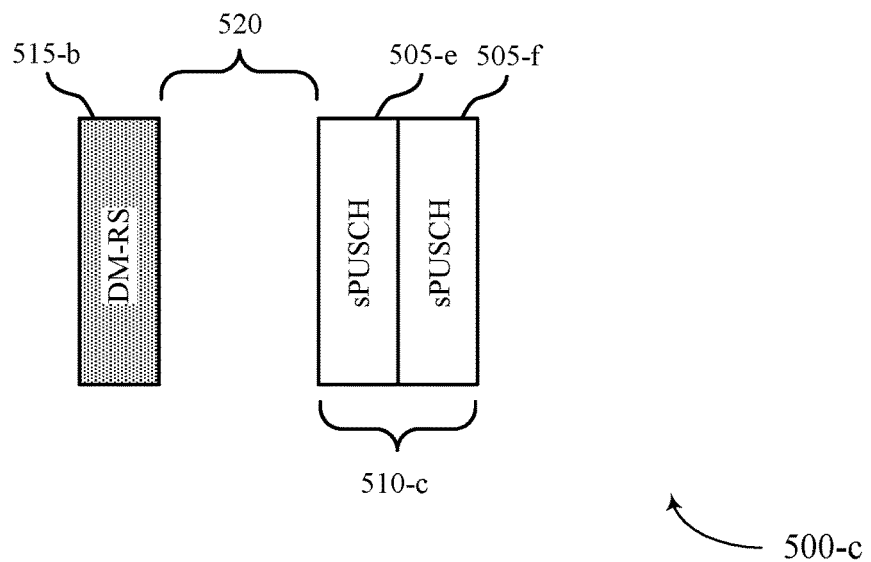
Figure 5D:
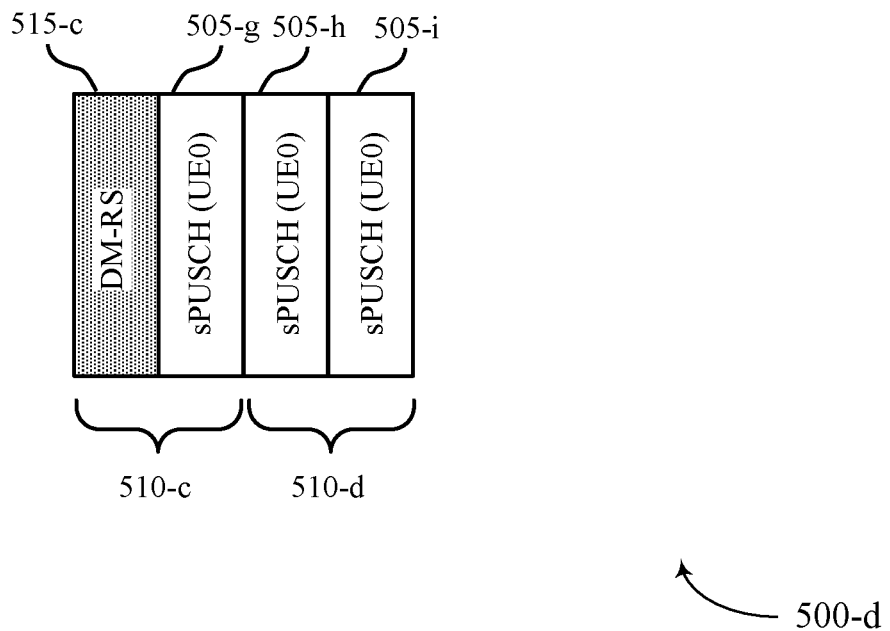

Uplink transmission 500-a illustrates an example of a self-containing two-symbol TTI 510-a. Two-symbol TTI 510-a may include a DM-RS symbol 515-a and sPUSCH symbol 505-a for a single UE 115. For example, a UE 115 that receives a DM-RS trigger (e.g., in an uplink grant) may transmit DM-RS symbol 515-a in the first symbol of the two-symbol TTI 510-a and transmit sPUSCH symbol 505-a in the second symbol of the two-symbol TTI-a. If the UE 115 does not receive a DM-RS trigger, the UE 115 (e.g., UE0) may transmit sPUSCH in both symbols of a two-symbol TTI. Such an example is depicted in FIG. 5B, in which both symbols of two-symbol TTI 510-a convey sPUSCH (e.g., the first symbol conveys sPUSCH symbol 505-c for UE0 and the second symbol conveys sPUSCH symbol 505-d for UE0). Thus, the payload for two-symbol TTI 510-b (e.g., one symbol) may be different from the payload for two-symbol TTI 510-a (e.g., two symbols).

In some cases, a configurable delay may be introduced between a DM-RS symbol and sPUSCH symbols. For example, configurable delay 520 may be introduced between DM-RS symbol 515-b and two-symbol TTI 510-c, which may include sPUSCH symbol 505-e and sPUSCH symbol 505-f. The configurable delay may be a number of symbol periods, or two-symbol TTIs periods, between a symbol with the DM-RS and the subsequent TTI. The number of symbol periods may include an even or odd integer number. The configurable delay 520 may temporally displace the DM-RS symbol 515-e so that the DM-RS symbol is transmitted prior to the symbol that is immediately before the first symbol of the two-symbol TTI 510-c. For example, the configurable delay 520 may be selected (e.g., as an integer number of symbols) so that the DM-RS symbol 515-e aligns with the DM-RS symbol of different UE 115. In some cases, the DM-RS symbol 515-e may be part of a two-symbol TTI that includes an empty symbol. In other cases, DM-RS symbol 515-e may be part of a one-symbol TTI.

In some examples, multiple two-symbol TTIs 510 may be sent consecutively. For example, in FIG. 5D, two two-symbol TTIs 510 are transmitted back-to-back. The two-symbol TTIs 510 may include one or more DM-RS symbols 515 and sPUSCH symbols for a UE 115 (e.g., UE0). The content of a two-symbol TTI 510 may be based on the presence, or absence, of DM-RS trigger(s) in an uplink grant to the UE 115. For example, the first two-symbol TTI 510-c may include both a DM-RS symbol and an sPUSCH symbol (DM-RS symbol 515-c and sPUSCH symbol 505-g) if a DM-RS trigger is received by the UE 115 for that particular sPUSCH symbol. The second two-symbol TTI 510-d may include two sPUSCH symbols (e.g., sPUSCH symbol 505-h and sPUSCH symbol 505-i) if a DM-RS trigger is not received for those particular sPUSCH symbols.

Figure 5E:
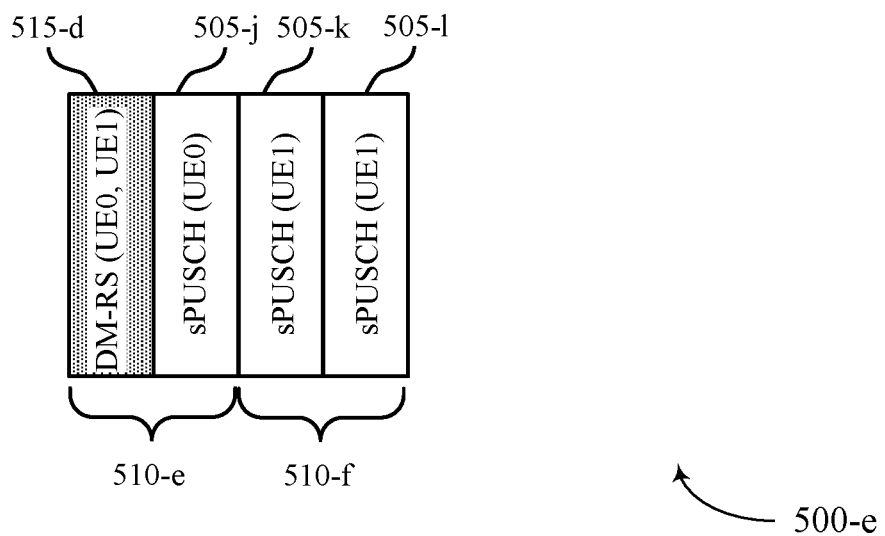

In some examples, an uplink grant can introduce a configurable delay (e.g., such as configurable delay 520) to delay the transmission of sPUSCH symbols with respect to the DM-RS symbol. An example of such a transmission is shown in FIG. 5E. In FIG. 5E, uplink transmission 500-e may include multiple (e.g., two or more) two-symbol TTIs 510. For example, uplink transmission 500-e may include two-symbol TTI 510-e and two-symbol TTI 510-f. Two-symbol TTI 510-e (e.g., the first two-symbol TTI) may include DM-RS symbol 515-d for multiple UEs 115 (e.g., UE0 and UE1) and an sPUSCH symbol 505-j for one of the UEs 115 (e.g., UE0). DM-RS symbols for different UEs 115 may be separated via cyclic offset. Two-symbol TTI 510-f may include sPUSCH symbols (e.g., sPUSCH symbol 505-k and sPUSCH symbol 505-1) for the other UE 115 (e.g., UE1).

In the example depicted in FIG. 5E, the configurable delay may be one (e.g., one symbol period) so that the DM-RS is transmitted in the first symbol in the first two-symbol TTI and sPUSCH symbols for a first UE 115 (e.g., UE 1) are transmitted in the two symbols of the second two-symbol TTI. The second symbol of the first two-symbol TTI may be empty (e.g., reserved for another UE 115, such as UE0). Thus, UE1 may transmit DM-RS in the first symbol of two-symbol TTI 510-e and may refrain from transmitting data (e.g., sPUSCH) in the second symbol of two-symbol TTI 510-e. The configurable delay for UE0 may be zero so that UE0 may transmit DM-RS in the first symbol of two-symbol TTI 510-c and sPUSCH in the second symbol of two-symbol TTI 510-c.

The UEs 115 may be scheduled their respective configurable delays, symbols, and two-symbol TTIs based on buffer size and/or quality of service (QoS) (e.g., the UE 115 with the largest buffer size or highest QoS may be scheduled two sPUSCH symbols 505). Or the UEs 115 may be assigned their respective symbols and two-symbol TTIs based on the order that scheduling requests from each UE 115 arrived at a base station 105 (e.g., UE0 may be assigned sPUSCH symbol 505-g because a scheduling request from UE0 arrived at the base station 105 earlier than a scheduling request from UE1). Although described with reference to two UEs 115, the techniques described herein for multiple UEs 115 may be used for any number of UEs 115.

Figure 6:
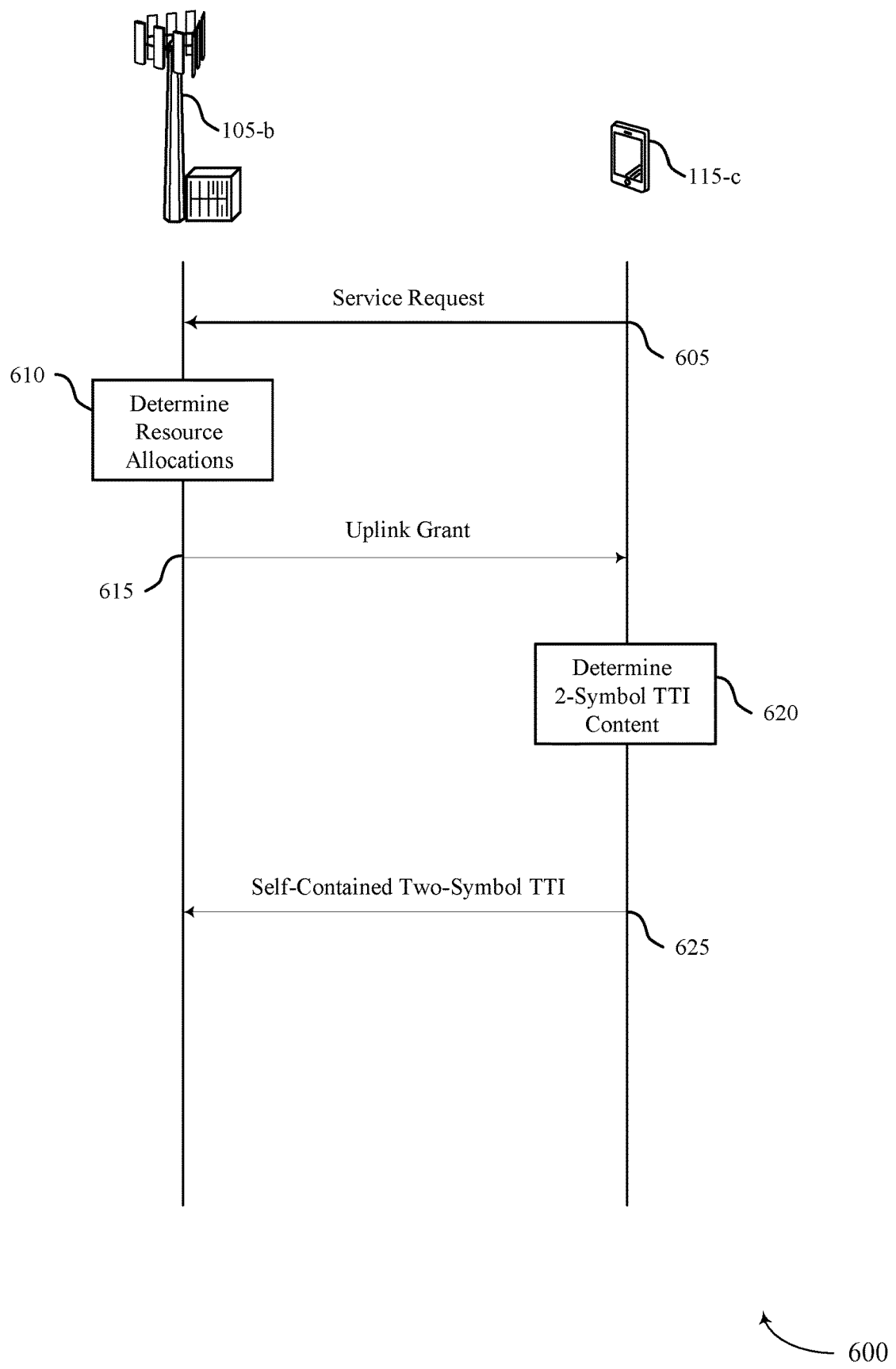
FIG. 6 illustrates an example of a process flow in a system that supports self-contained uplink for reduced duration TTIs in accordance with aspects of the present disclosure.

FIG. 6 illustrates an example of a process flow 600 that supports self-contained uplink for reduced duration transmission time intervals in accordance with various aspects of the present disclosure. Process flow 600 may include steps or signaling performed by UE 115-c and base station 105-b, which may be examples of a UE 115 or base station 105 described above with reference to FIGS. 1 and 2. In some examples, a base station 105-b may transmit a two-symbol TTI transmission to a low latency UE 115-c using resources that are also available for legacy transmissions.

At 605, UE 115-c may transmit, and base station 105-b may receive, a scheduling request. The scheduling request may request uplink resources (e.g., time and frequency) to be allocated/scheduled for UE 115-c. A scheduling request may also be referred to as a service request. The scheduling request may include uplink buffer size information, priority level information, and/or a QoS information associated with UE 115-c. At 610, base station 105-b may determine resource allocations (e.g., scheduling) for UE 115-c. In some cases, base station 105-b may determine whether a DM-RS is scheduled to be transmitted in one symbol of a two-symbol TTI sent by UE 115-c. Base station 105-b may determine the resource allocations based on the timing of the scheduling request sent by the UE 115-c, or based on the uplink buffer size information or the QoS information associated with UE 115-c.

At 615, base station 105-b may transmit, and UE 115-c may receive, an uplink grant that includes an uplink resource allocation for UE 115-c. The uplink resource allocation may be received in a downlink control channel (e.g., sPDCCH) during a two-symbol TTI. Alternatively, the uplink resource allocation may be received in a downlink control channel of during TTI that has a longer duration than the two-symbol TTI (e.g., the uplink resource allocation may be received in a downlink control channel during a legacy TTI).

The uplink resource allocation may include an indication of the time and frequency resources assigned for use by UE 115-c for uplink communication. The uplink resource allocation may be associated with two-symbol TTIs (e.g., the uplink resource allocation may include an indication that UE 115-c is to use two-symbol TTIs for uplink). In some cases, the uplink resource allocation may include one or more DM-RS triggers that indicate to UE 115-c that DM-RS is to be sent for particular sPUSCHs. Additionally or alternatively, the uplink resource allocation may include an indication of the number of symbol periods between DMRS symbol and a subsequent TTI (e.g., a two-symbol TTI). For example, the uplink resource allocation may include an indication of a configurable delay.

At 620, UE 115-c may determine the content of one or more two-symbol TTIs based at least in part on the uplink grant. For example, UE 115-c may determine whether DM-RS is scheduled to be transmitted as part of a self-contained two-symbol TTI. In some cases, the determination may be based on uplink resource allocation (e.g., the determination may be based on the presence or absence of a DM-RS trigger in the uplink resource allocation).

At 625, UE 115-c may transmit, and base station 105-c may receive, a self-contained two-symbol TTI. The self-contained two-symbol TTI may be an example of an uplink transmission 500 described with reference to FIGS. 5A-5E. The self-contained two-symbol TTI may include DM-RS and/or data (e.g., sPUSCH). For example, both DM-RS and data may be transmitted during the two-symbol TTI if UE 115-c determines that the DM-RS is scheduled. The DM-RS may be transmitted in a first symbol of the two-symbol TTI and the data may be transmitted in a second symbol of the two-symbol TTI. In some examples of such cases, UE 115-c may transmit additional data during a subsequent TTI (e.g., a two-symbol TTI). The subsequent TTI may exclude DM-RS and may be sent according to a configurable delay.

In some cases, UE 115-c may transmit DM-RS in the first symbol of the two-symbol TTI and refrain from transmitting during the second symbol of the two-symbol TTI. In such cases, the second symbol of the two-symbol TTI may be reserved for or available for communications by another UE 115. In some examples, the first symbol of the two-symbol TTI includes DM-RS from multiple UEs 115 (e.g., UE 115-c and another UE 115). The DM-RS may be cyclically shifted relative to each other to provide for detection at base station 105-b. In such a scenario, the second symbol may include data from one of the UEs 115 and a subsequent twos-symbol TTI may exclude DM-RS.

Figure 7:
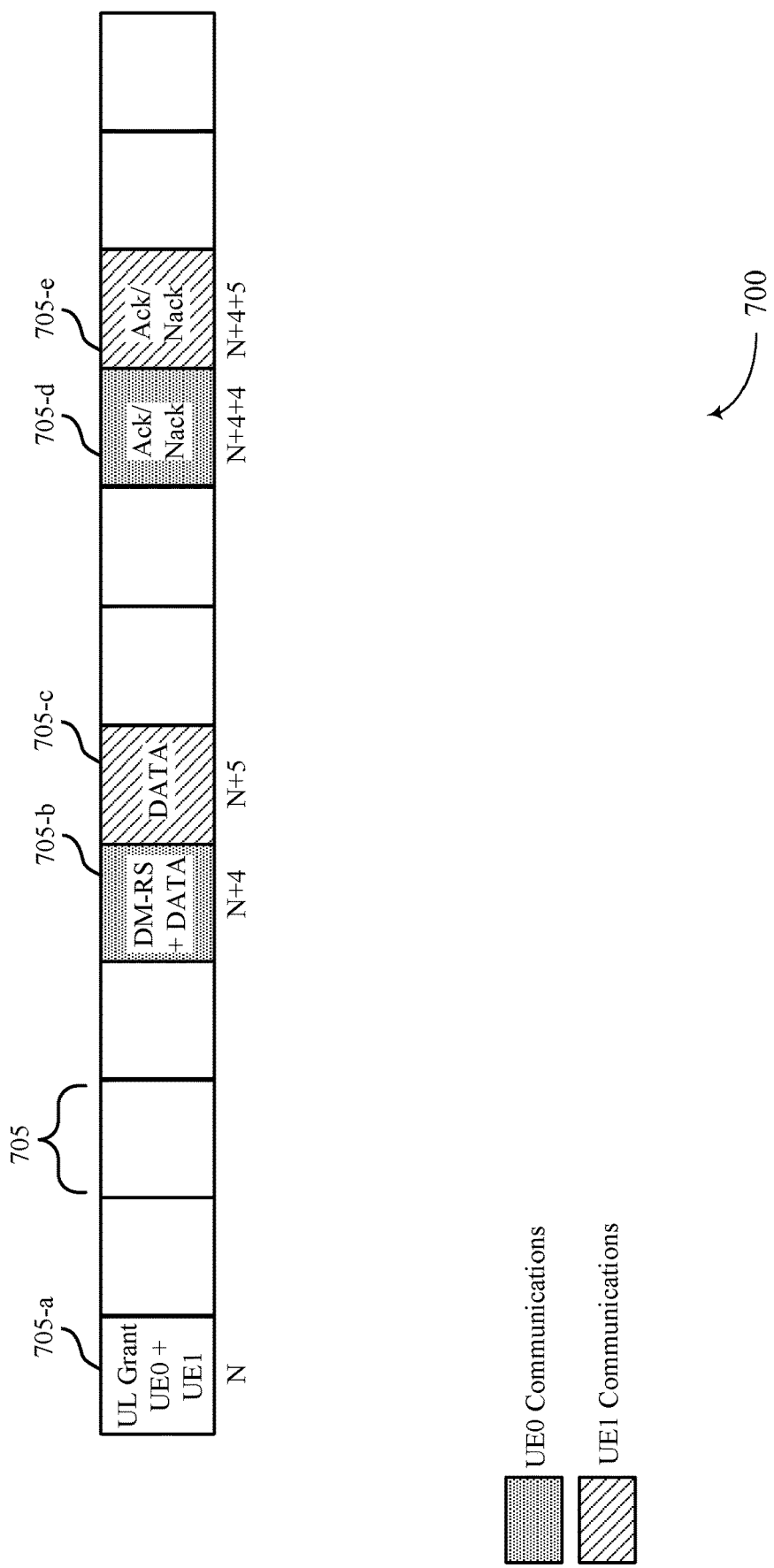
FIG. 7 illustrates an example of a transmission timing diagram that supports self-contained uplink for reduced duration TTIs in accordance with aspects of the present disclosure.

FIG. 7 illustrates an example of a transmission timing diagram 700 that supports self-contained uplink for reduced duration transmission time intervals in accordance with various aspects of the present disclosure. Transmission timing diagram 700 may include steps or signaling performed by a UE 115 and base station 105, which may be examples of a UE 115 or base station 105 described above with reference to FIGS. 1 and 2. Transmission timing diagram 700 may include a number of two-symbol TTIs 705. Transmission timing diagram assumes a processing duration of four two-symbol TTIs.

A base station 105 may transmit an uplink grant in two-symbol TTI N (e.g., two-symbol TTI 705-a). The uplink grant may include uplink resource allocation scheduling information for two UEs (e.g., UE0 and UE 1). Each UE may receive the uplink grant and determine uplink transmission resources based on the resource allocation scheduling information. The uplink grant may include a DM-RS trigger for UE0 and a DM-RS trigger for UE1. The uplink grant may also include a DM-RS offset for UE0 and a DM-RS offset for UE1. Responsive to the uplink grant, UE0 may transmit DM-RS in the first symbol of two-symbol TTI N+4 (e.g., two-symbol TTI 705-b) and transmit data (e.g., sPUSCH) in the second symbol of two-symbol TTI N+4 (e.g., two-symbol TTI 705-b). Also responsive to the uplink grant, UE1 may transmit DM-RS in the first symbol of two-symbol TTI N+4 (e.g., two-symbol TTI 705-b) and transmit data in both symbols of two-symbol TTI N+5 (e.g., two-symbol TTI 705-c).

The base station 105 may transmit acknowledgments (ACKs) or negative-acknowledgments (NACKs) to both UEs based on the success of reception of the respective data from the UEs. For example, the base station 105 may send an ACK to UE0 in two-symbol TTI N+4+4 (e.g., two-symbol TTI 705-d) if the data in two-symbol TTI N+4 (e.g., two-symbol TTI 705-*b*) is successfully received. Alternatively, the base station 105 may send a NACK to UE0 in two-symbol TTI N+4+4 (e.g., two-symbol TTI 705-*d*) if the DMRS and data in two-symbol TTI N+4 (e.g., two-symbol TTI 705-*b*) is not successfully received. Similarly, the base station 105 may send an ACK to UE1 in two-symbol TTI N+4+5 (e.g., two-symbol TTI 705-*e*) if the data in two-symbol TTI N+5 (e.g., two-symbol TTI 705-*c*) is successfully received. Or the base station 105 may send a NACK to UE1 in two-symbol TTI N+4+5 (e.g., two-symbol TTI 705-*e*) if the data in two-symbol TTI N+5 (e.g., two-symbol TTI 705-*c*) is not successfully received. Thus, the latency for hybrid automatic repeat request (HARD) processes for self-contained two-symbol TTIs may be reduced compared to legacy TTIs (e.g., subframe TTIs).

Figure 8:
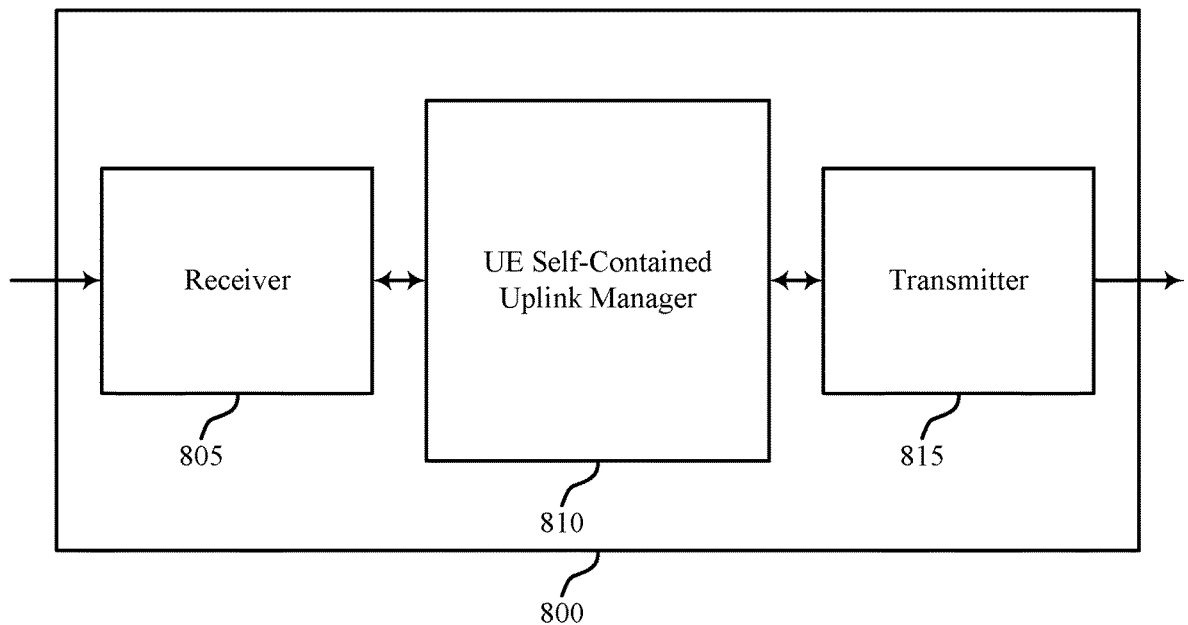
FIGS. 8 through 10 show block diagrams of a wireless device that supports self-contained uplink for reduced duration TTIs in accordance with aspects of the present disclosure.

FIG. 8 shows a block diagram of a wireless device 800 that supports self-contained uplink for reduced duration TTIs in accordance with various aspects of the present disclosure. Wireless device 800 may be an example of aspects of a UE 115 described with reference to FIGS. 1 and 2. Wireless device 800 may include receiver 805, UE self-contained uplink manager 810 and transmitter 815. Wireless device 800 may also include a processor. Each of these components may be in communication with each other.

The receiver 805 may receive information such as packets, user data, or control information associated with various information channels (e.g., control channels, data channels, and information related to self-contained uplink for reduced duration TTIs, etc.). In some cases, the receiver 805 may receive an uplink resource allocation (e.g., conveyed by a downlink control channel such as sPDCCH). Information may be passed on to other components of the device. The receiver 805 may be an example of aspects of the transceiver 1125 described with reference to FIG. 11.

The UE self-contained uplink manager 810 may receive an uplink resource allocation that is associated with a two-symbol TTI and determine whether a DM-RS is scheduled to be transmitted in one symbol of the two-symbol TTI as part of the uplink resource allocation. The UE self-contained uplink manager 810 may also transmit data or the DM-RS, or both, during the two-symbol TTI based on the determination of whether the DM-RS is scheduled. The UE self-contained uplink manager 810 may also be an example of aspects of the UE self-contained uplink manager 1000 described with reference to FIG. 11.

The transmitter 815 may transmit signals received from other components of wireless device 800. In some examples, the transmitter 815 may be collocated with a receiver in a transceiver module. For example, the transmitter 815 may be an example of aspects of the transceiver 1125 described with reference to FIG. 11. In some examples, the transmitter 815 may transmit two-symbol TTIs such as described herein. The transmitter 815 may include a single antenna, or it may include a plurality of antennas.

Figure 9:
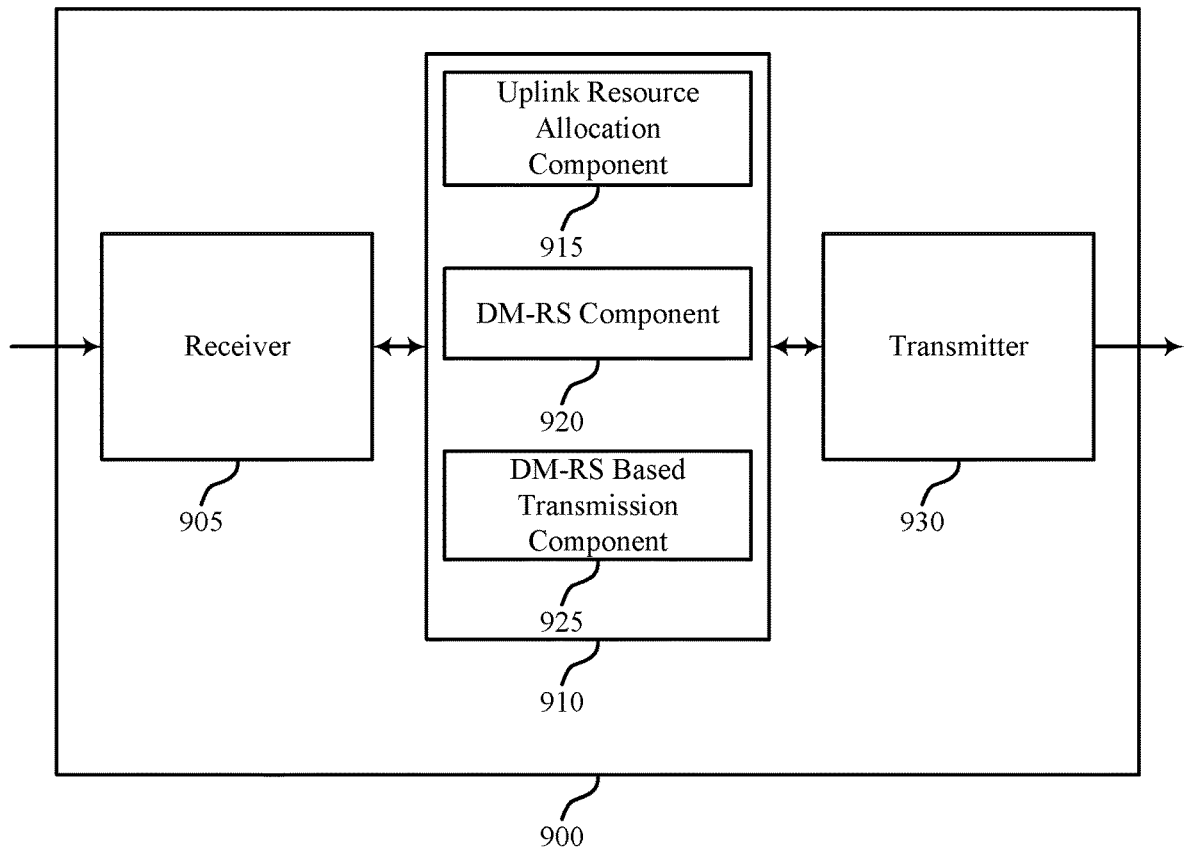

FIG. 9 shows a block diagram of a wireless device 900 that supports self-contained uplink for reduced duration TTIs in accordance with various aspects of the present disclosure. Wireless device 900 may be an example of aspects of a wireless device 800 or a UE 115 described with reference to FIGS. 1, 2 and 8. Wireless device 900 may include receiver 905, UE self-contained uplink manager 910 and transmitter 930. Wireless device 900 may also include a processor. Each of these components may be in communication with each other.

The receiver 905 may receive information which may be passed on to other components of the device. The receiver 905 may also perform the functions described with reference to the receiver 805 of FIG. 8. The receiver 905 may be an example of aspects of the transceiver 1125 described with reference to FIG. 11. The transmitter 930 may transmit signals received from other components of wireless device 900. In some examples, the transmitter 930 may be collocated with a receiver in a transceiver module. For example, the transmitter 930 may be an example of aspects of the transceiver 1125 described with reference to FIG. 11. The transmitter 930 may utilize a single antenna, or it may utilize a plurality of antennas.

The UE self-contained uplink manager 910 may be an example of aspects of UE self-contained uplink manager 910 described with reference to FIG. 9. The UE self-contained uplink manager 910 may include uplink resource allocation component 915, DM-RS component 920 and DM-RS based transmission component 925. The UE self-contained uplink manager 910 may be an example of aspects of the UE self-contained uplink manager 1105 described with reference to FIG. 11.

The uplink resource allocation component 915 may receive an uplink resource allocation that is associated with a two-symbol TTI. In some cases, the uplink resource allocation includes an indication of a number of symbol periods between a symbol with the DM-RS and the subsequent TTI. In such cases, additional data may be transmitted according to the indication. In some cases, the uplink resource allocation is received in a downlink control channel (e.g., PDCCH or sPDCCH) during a prior two-symbol TTI. In some cases, the uplink resource allocation is received in a downlink control channel of during TTI that has a longer duration than the two-symbol TTI.

The DM-RS component 920 may determine whether a DM-RS is scheduled to be transmitted in one symbol of the two-symbol TTI as part of the uplink resource allocation. In some cases, the DM-RS component 920 may determine that the DM-RS is scheduled. In some cases, the DM-RS and the data are transmitted during the two-symbol TTI. The DM-RS based transmission component 925 may transmit the data during a second symbol of the two-symbol TTI, transmit data during a subsequent TTI that excludes another DM-RS, and transmit data or the DM-RS, or both, during the two-symbol TTI based on the determination of whether the DM-RS is scheduled. In some cases, the number of symbol periods between the symbol with the DM-RS and the subsequent TTI includes an odd number. In some cases, the transmitting includes transmitting the DM-RS during a first symbol of the two-symbol TTI. In some cases, the transmitting includes transmitting the DM-RS during a first symbol of the two-symbol TTI. In some cases, the first symbol of the two-symbol TTI includes DM-RS transmissions from two or more UE.

Figure 10:
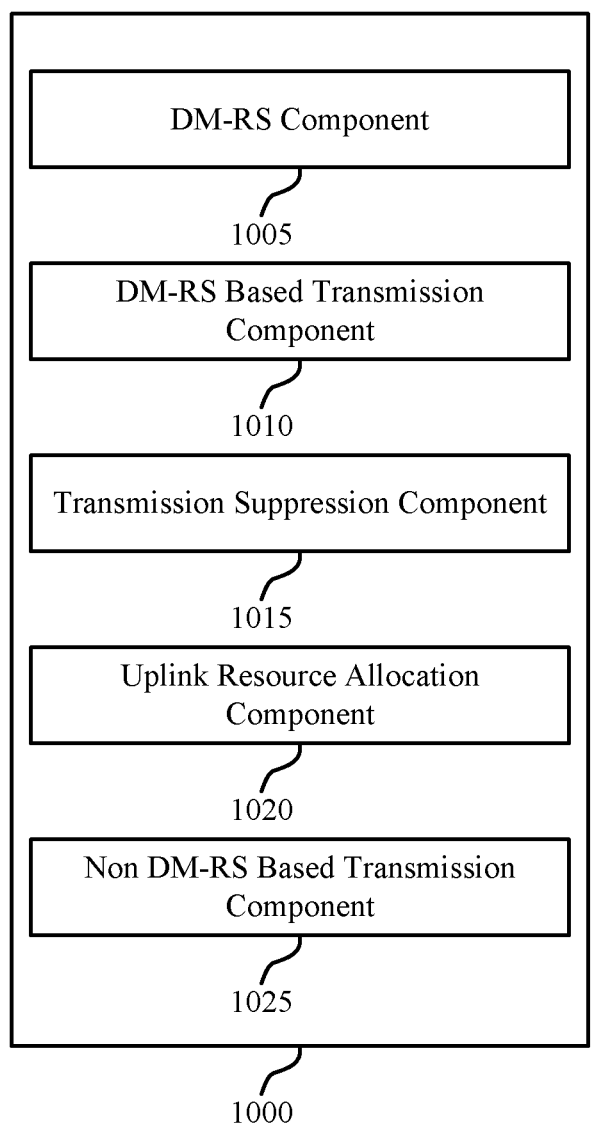

FIG. 10 shows a block diagram of a UE self-contained uplink manager 1000 which may be an example of the corresponding component of wireless device 800 or wireless device 900. That is, UE self-contained uplink manager 1000 may be an example of aspects of UE self-contained uplink manager 810 or UE self-contained uplink manager 910 described with reference to FIGS. 8 and 9. The UE self-contained uplink manager 1000 may also be an example of aspects of the UE self-contained uplink manager 1105 described with reference to FIG. 11.

The UE self-contained uplink manager 1000 may include DM-RS component 1005, DM-RS based transmission component 1010, transmission suppression component 1015, uplink resource allocation component 1020 and non DM-RS based transmission component 1025. Each of these modules may communicate, directly or indirectly, with one another (e.g., via one or more buses).

The DM-RS component 1005 may determine that a DM-RS is scheduled to be transmitted in one symbol of the two-symbol TTI as part of the uplink resource allocation. In such cases, the DM-RS and the data may be transmitted during the two-symbol TTI. The DM-RS based transmission component 1010 may transmit the data during a second symbol of the two-symbol TTI, transmit data during a subsequent TTI that excludes another DM-RS, and transmit data or the DM-RS, or both, during the two-symbol TTI based on the determination of whether the DM-RS is scheduled.

The transmission suppression component 1015 may refrain from transmitting during a second symbol of the two-symbol TTI. In such cases, resources of the second symbol TTI may be available for communications by another device. The uplink resource allocation component 1020 may receive an uplink resource allocation that is associated with a two-symbol TTI. The non DM-RS based transmission component 1025 may transmit additional data during a subsequent TTI, where the subsequent TTI excludes another DM-RS.

Figure 11:
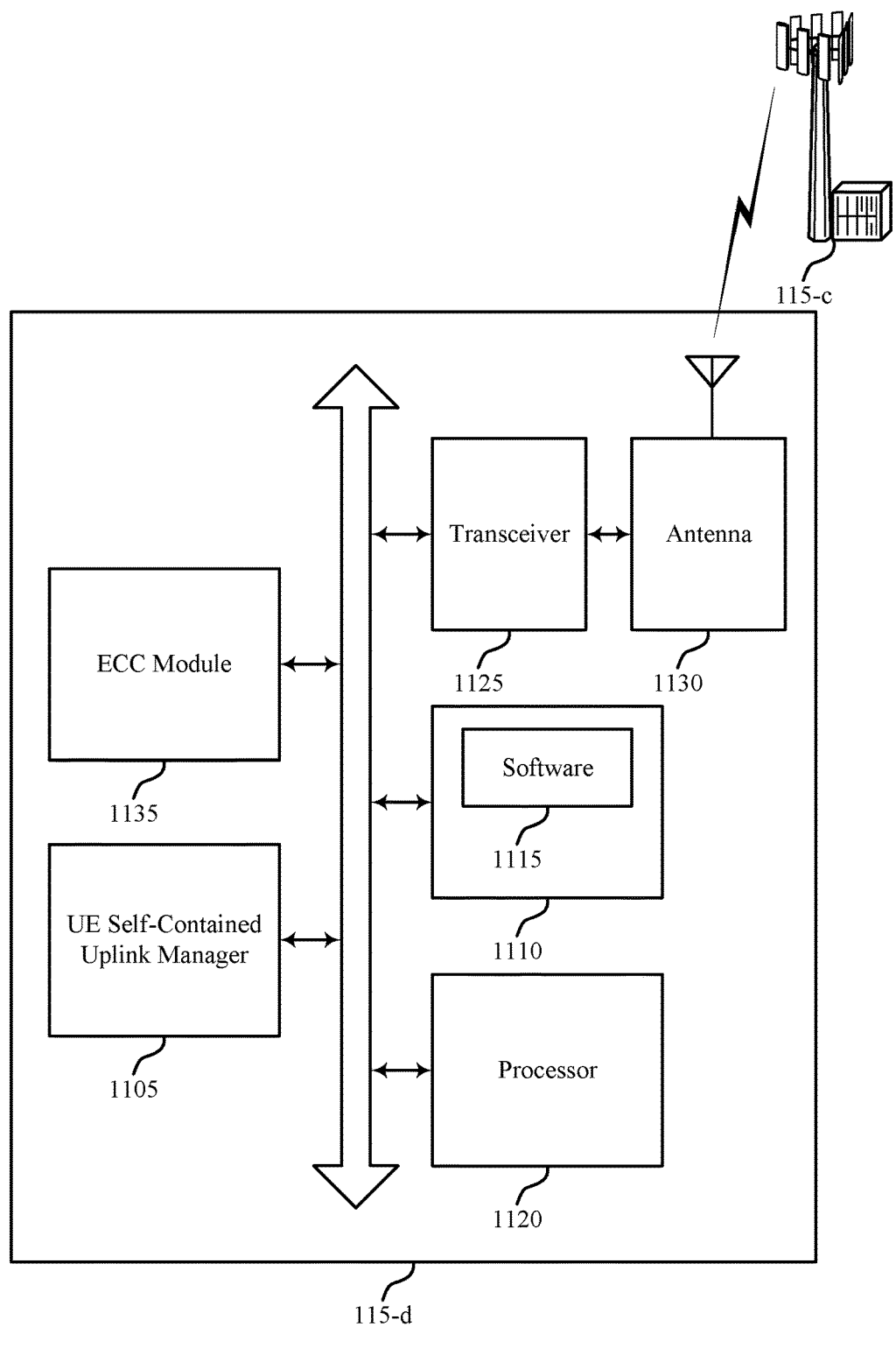
FIG. 11 illustrates a block diagram of a system including a UE that supports self-contained uplink for reduced duration TTIs in accordance with aspects of the present disclosure.

FIG. 11 shows a diagram of a system 1100 including a device that supports self-contained uplink for reduced duration TTIs in accordance with various aspects of the present disclosure. For example, system 1100 may include UE 115-d, which may be an example of a wireless device 800, a wireless device 900, or a UE 115 as described with reference to FIGS. 1, 2 and 8 through 10.

UE 115-d may also include UE self-contained uplink manager 1105, memory 1110, processor 1120, transceiver 1125, antenna 1130 and ECC module 1135. Each of these modules may communicate, directly or indirectly, with one another (e.g., via one or more buses). The UE self-contained uplink manager 1105 may be an example of a UE self-contained uplink manager as described with reference to FIGS. 8 through 10.

The memory 1110 may include random access memory (RAM) and read only memory (ROM). The memory 1110 may store computer-readable, computer-executable software including instructions that, when executed, cause the processor to perform various functions described herein (e.g., self-contained uplink for reduced duration TTIs, etc.). In some cases, the software 1115 may not be directly executable by the processor but may cause a computer (e.g., when compiled and executed) to perform functions described herein. The processor 1120 may include an intelligent hardware device, (e.g., a central processing unit (CPU), a microcontroller, an application specific integrated circuit (ASIC), etc.).

The transceiver 1125 may communicate bi-directionally, via one or more antennas, wired, or wireless links, with one or more networks, as described above. For example, the transceiver 1125 may communicate bi-directionally with a base station 105 or a UE 115. The transceiver 1125 may also include a modem to modulate the packets and provide the modulated packets to the antennas for transmission, and to demodulate packets received from the antennas. In some cases, the wireless device may include a single antenna 1130. However, in some cases the device may have more than one antenna 1130, which may be capable of concurrently transmitting or receiving multiple wireless transmissions. ECC module 1135 may enable operations using ECCs such as communication using shared or unlicensed spectrum, using reduced TTIs or subframe durations, or using a large number of component carriers.

Figure 12:
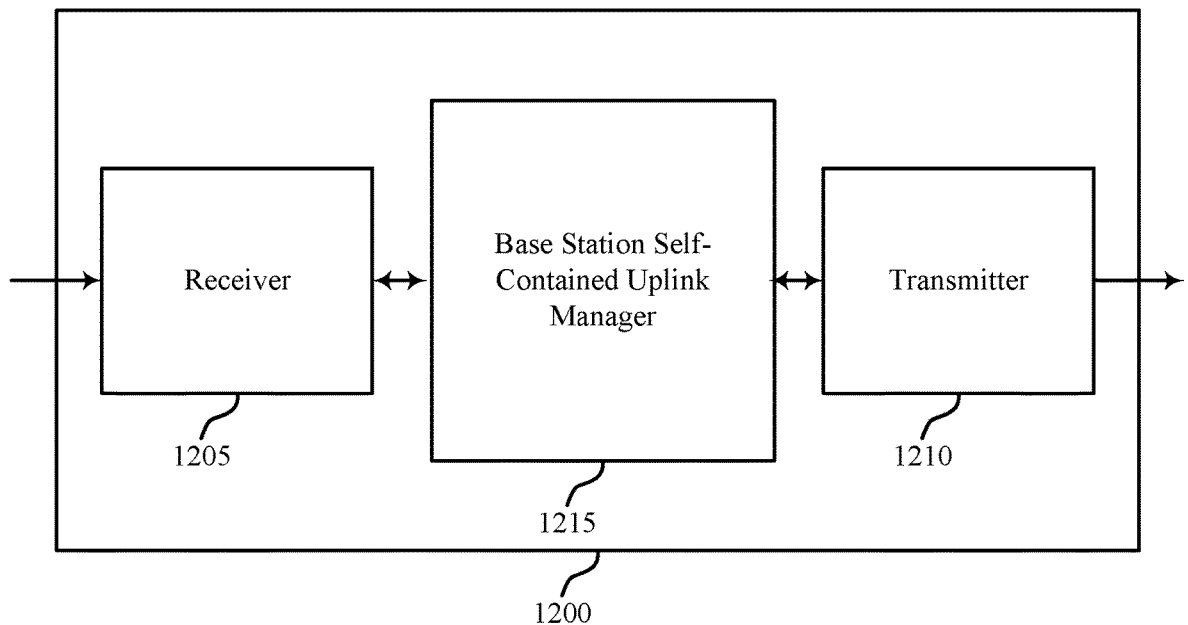
FIGS. 12 through 14 show block diagrams of a wireless device that supports self-contained uplink for reduced duration TTIs in accordance with aspects of the present disclosure.

FIG. 12 shows a block diagram of a wireless device 1200 that supports self-contained uplink for reduced duration TTIs in accordance with various aspects of the present disclosure. Wireless device 1200 may be an example of aspects of a base station 105 described with reference to FIGS. 1 and 2. Wireless device 1200 may include receiver 1205, transmitter 1210 and base station self-contained uplink manager 1215. Wireless device 1200 may also include a processor. Each of these components may be in communication with each other.

The receiver 1205 may receive information such as packets, user data, or control information associated with various information channels (e.g., control channels, data channels, and information related to self-contained uplink for reduced duration TTIs, etc.). In some cases, the receiver 1205 may receive two-symbol TTIs from a UE 115 such as described herein. Information may be passed on to other components of the device. The receiver 1205 may be an example of aspects of the transceiver 1525 described with reference to FIG. 15.

The transmitter 1210 may transmit signals received from other components of wireless device 1200. In some cases, the transmitter 1210 may transmit an uplink resource allocation in a downlink control channel (e.g., PDCCH or sPDCCH). In some examples, the transmitter 1210 may be collocated with a receiver in a transceiver module. For example, the transmitter 1210 may be an example of aspects of the transceiver 1525 described with reference to FIG. 15. The transmitter 1210 may include a single antenna, or it may include a plurality of antennas.

The base station self-contained uplink manager 1215 may transmit an uplink resource allocation that is associated with a two-symbol TTI and determine whether a DM-RS is scheduled to be transmitted in one symbol of the two-symbol TTI as part of the uplink resource allocation. The base station self-contained uplink manager 1215 may receive data or the DM-RS, or both, during the two-symbol TTI based on the determination of whether the DM-RS is scheduled. The base station self-contained uplink manager 1215 may also be an example of aspects of the base station self-contained uplink manager 1400 described with reference to FIG. 14.

Figure 13:
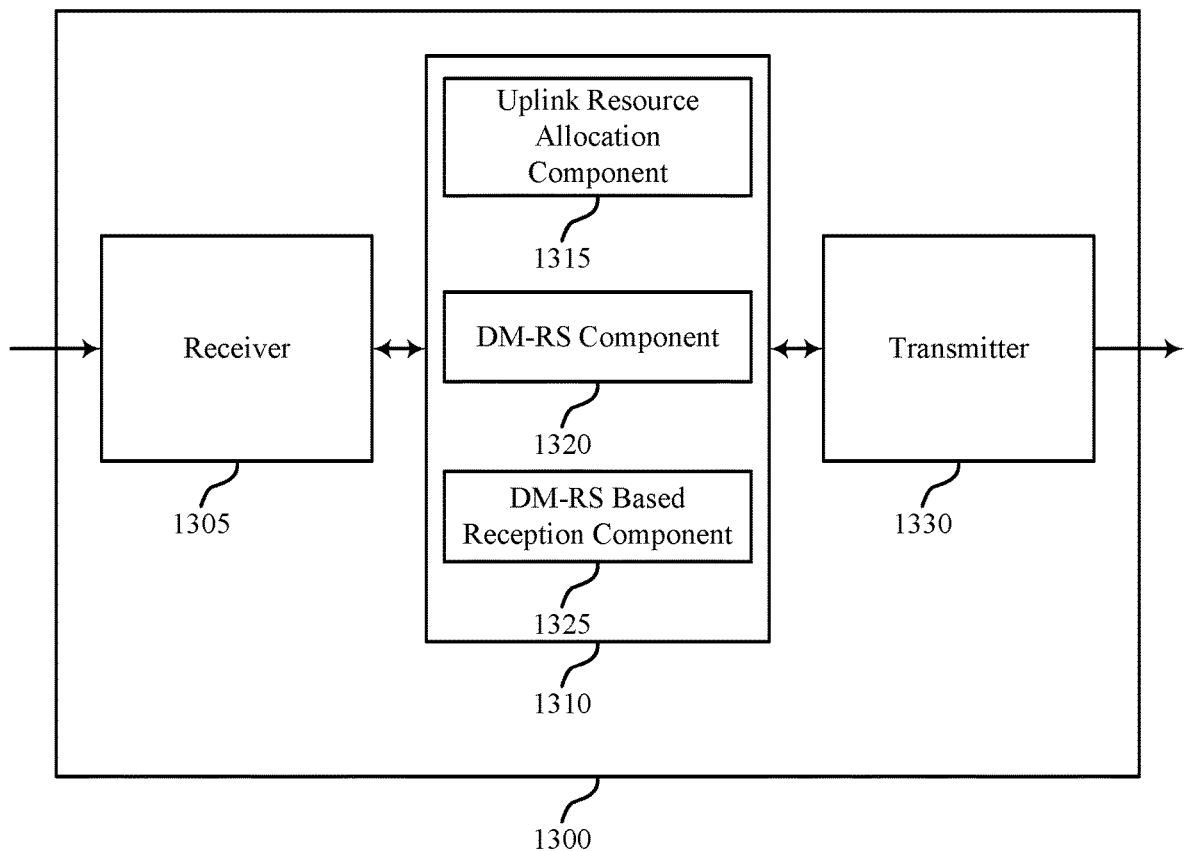

FIG. 13 shows a block diagram of a wireless device 1300 that supports self-contained uplink for reduced duration TTIs in accordance with various aspects of the present disclosure. Wireless device 1300 may be an example of aspects of a wireless device 1200 or a base station 105 described with reference to FIGS. 1, 2 and 12. Wireless device 1300 may include receiver 1305, base station self-contained uplink manager 1310 and transmitter 1330. Wireless device 1300 may also include a processor. Each of these components may be in communication with each other.

The receiver 1305 may receive information which may be passed on to other components of the device. The receiver 1305 may also perform the functions described with reference to the receiver 1205 of FIG. 12. The receiver 1305 may be an example of aspects of the transceiver 1525 described with reference to FIG. 15. The transmitter 1330 may transmit signals received from other components of wireless device 1300. In some examples, the transmitter 1330 may be collocated with a receiver in a transceiver module. For example, the transmitter 1330 may be an example of aspects of the transceiver 1525 described with reference to FIG. 15. The transmitter 1330 may utilize a single antenna, or it may utilize a plurality of antennas.

The base station self-contained uplink manager 1310 may be an example of aspects of base station self-contained uplink manager 1215 described with reference to FIG. 12. The base station self-contained uplink manager 1310 may include uplink resource allocation component 1315, DM-RS component 1320 and DM-RS based reception component 1325. The base station self-contained uplink manager 1310 may be an example of aspects of the base station self-contained uplink manager 1400 described with reference to FIG. 14.

The uplink resource allocation component 1315 may transmit an uplink resource allocation that is associated with a two-symbol TTI. The DM-RS component 1320 may determine whether a DM-RS is scheduled to be transmitted in one symbol of the two-symbol TTI as part of the uplink resource allocation. In some cases, the uplink resource allocation component 1315 may determine that the DM-RS is scheduled. In such cases, the DM-RS and the data may be received during the two-symbol TTI.

The DM-RS based reception component 1325 may receive data or the DM-RS, or both, during the two-symbol TTI based on the determination of whether the DM-RS is scheduled. In some cases, the DM-RS based reception component 1325 may receive additional data during a subsequent TTI which excludes another DM-RS. The DM-RS based reception component 1325 may also receive the data during a second symbol of the two-symbol TTI. In some cases, the receiving includes receiving the DM-RS during a first symbol of the two-symbol TTI. In some cases, the receiving includes receiving the DM-RS during a first symbol of the two-symbol TTI, where the DM-RS is associated with a first UE.

Figure 14:
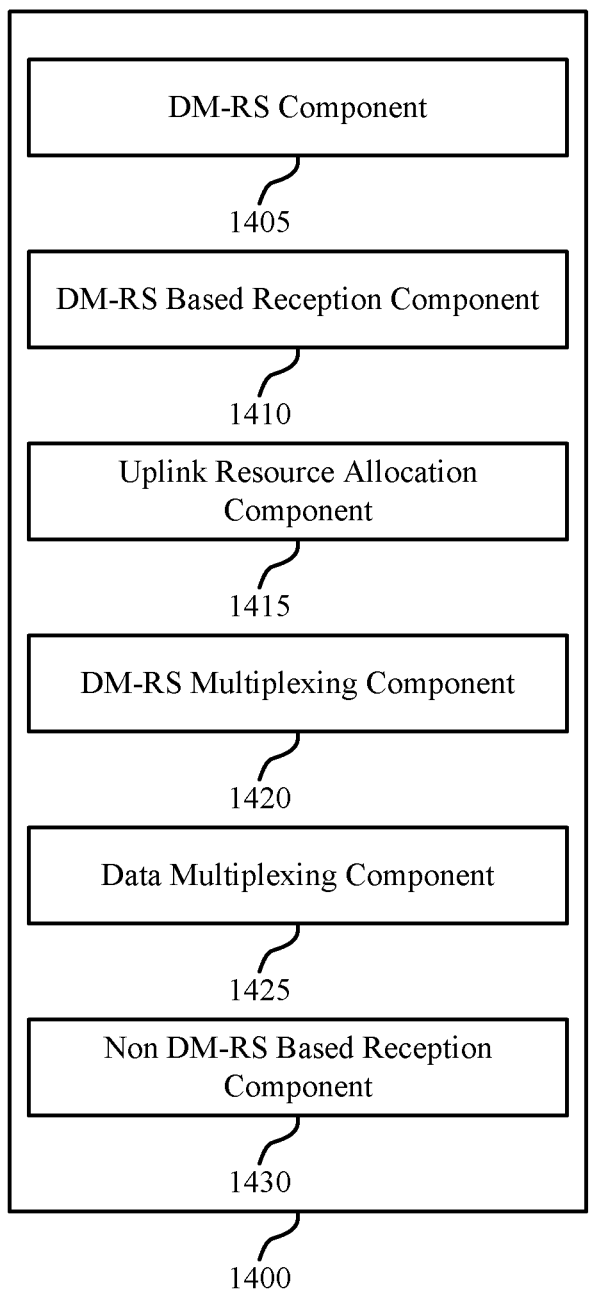

FIG. 14 shows a block diagram of a base station self-contained uplink manager 1400 which may be an example of the corresponding component of wireless device 1200 or wireless device 1300. That is, base station self-contained uplink manager 1400 may be an example of aspects of base station self-contained uplink manager 1215 or base station self-contained uplink manager 1310 described with reference to FIGS. 12 and 13. The base station self-contained uplink manager 1400 may also be an example of aspects of the base station self-contained uplink manager 1400 described with reference to FIG. 14.

The base station self-contained uplink manager 1400 may include DM-RS component 1405, DM-RS based reception component 1410, uplink resource allocation component 1415, DM-RS multiplexing component 1420, data multiplexing component 1425 and non DM-RS based reception component 1430. Each of these modules may communicate, directly or indirectly, with one another (e.g., via one or more buses).

The DM-RS component 1405 may determine whether a DM-RS is scheduled to be transmitted in one symbol of the two-symbol TTI as part of the uplink resource allocation. In some cases, the DM-RS component 1405 may determine that the DM-RS is scheduled. In such cases, the DM-RS and the data may be received during the two-symbol TTI.

The DM-RS based reception component 1410 may receive data or the DM-RS, or both, during the two-symbol TTI based on the determination of whether the DM-RS is scheduled. The DM-RS based reception component 1410 may receive additional data during a subsequent TTI which excludes another DM-RS. In some cases, the DM-RS based reception component 1410 receives the data during a second symbol of the two-symbol TTI. In some cases, the receiving includes receiving the DM-RS during a first symbol of the two-symbol TTI. In some cases, the receiving includes receiving the DM-RS during a first symbol of the two-symbol TTI, where the DM-RS is associated with a first UE.

The uplink resource allocation component 1415 may transmit an uplink resource allocation that is associated with a two-symbol TTI. The DM-RS multiplexing component 1420 may receive another DM-RS during the first symbol of the two-symbol TTI, where the other DM-RS is associated with a second UE. The data multiplexing component 1425 may receive data from the second UE during a second symbol of the two-symbol TTI. The non DM-RS based reception component 1430 may receive data from the first UE during a subsequent TTI that excludes another DM-RS.

Figure 15:
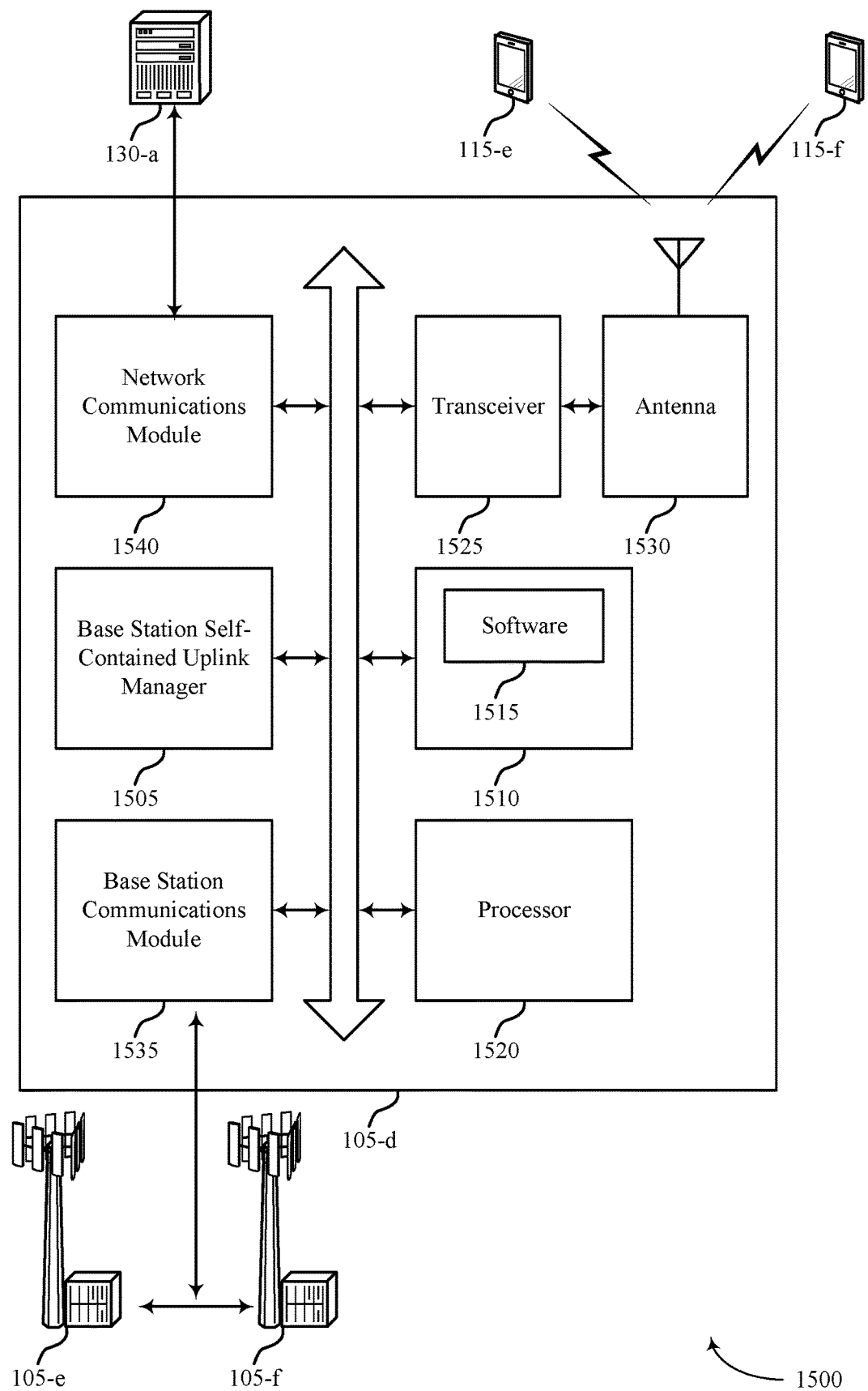
FIG. 15 illustrates a block diagram of a system including a base station that supports self-contained uplink for reduced duration TTIs in accordance with aspects of the present disclosure.

FIG. 15 shows a diagram of a wireless system 1500 including a device configured that supports self-contained uplink for reduced duration TTIs in accordance with various aspects of the present disclosure. For example, wireless system 1500 may include base station 105-d, which may be an example of a wireless device 1200, a wireless device 1300, or a base station 105 as described with reference to FIGS. 1, 2 and 12 through 14. Base station 105-d may also include components for bi-directional voice and data communications including components for transmitting communications and components for receiving communications. For example, base station 105-d may communicate bi-directionally with one or more UEs 115.

Base station 105-d may also include base station self-contained uplink manager 1505, memory 1510, processor 1520, transceiver 1525, antenna 1530, base station communications module 1535 and network communications module 1540. Each of these modules may communicate, directly or indirectly, with one another (e.g., via one or more buses). The base station self-contained uplink manager 1505 may be an example of a base station self-contained uplink manager as described with reference to FIGS. 12 through 14.

The memory 1510 may include RAM and ROM. The memory 1510 may store computer-readable, computer-executable software including instructions that, when executed, cause the processor to perform various functions described herein (e.g., self-contained uplink for reduced duration TTIs, etc.). In some cases, the software 1515 may not be directly executable by the processor but may cause a computer (e.g., when compiled and executed) to perform functions described herein. The processor 1520 may include an intelligent hardware device, (e.g., a CPU, a microcontroller, an ASIC, etc.).

The transceiver 1525 may communicate bi-directionally, via one or more antennas, wired, or wireless links, with one or more networks, as described above. For example, the transceiver 1525 may communicate bi-directionally with a base station 105 or a UE 115. The transceiver 1525 may also include a modem to modulate the packets and provide the modulated packets to the antennas for transmission, and to demodulate packets received from the antennas. In some cases, the wireless device may include a single antenna 1530. However, in some cases the device may have more than one antenna, which may be capable of concurrently transmitting or receiving multiple wireless transmissions.

The base station communications module 1535 may manage communications with other base station 105, and may include a controller or scheduler for controlling communications with UEs 115 in cooperation with other base stations 105. For example, the base station communications module 1535 may coordinate scheduling for transmissions to UEs 115 for various interference mitigation techniques such as beamforming or joint transmission. In some examples, base station communications module 1535 may provide an X2 interface within an LTE/LTE-A wireless communication network technology to provide communication between base stations 105. The network communications module 1540 may manage communications with the core network (e.g., via one or more wired backhaul links). For example, the network communications module 1540 may manage the transfer of data communications for client devices, such as one or more UEs 115.

Figure 16:
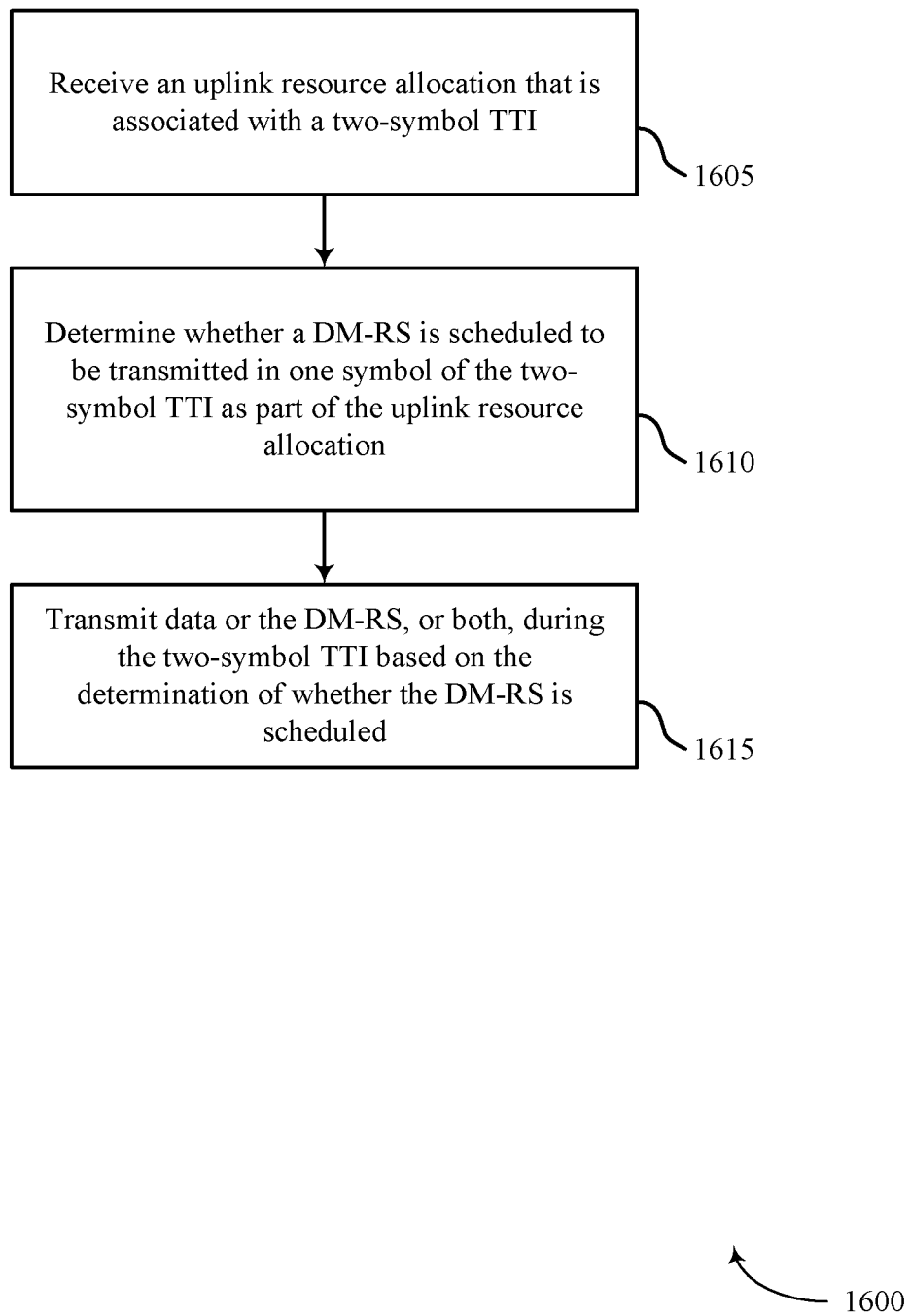
FIGS. 16 through 17 illustrate methods for self-contained uplink for reduced duration TTIs in accordance with aspects of the present disclosure.

FIG. 16 shows a flowchart illustrating a method 1600 for self-contained uplink for reduced duration TTIs in accordance with various aspects of the present disclosure. The operations of method 1600 may be implemented by a device such as a UE 115 or its components as described with reference to FIGS. 1 and 2. For example, the operations of method 1600 may be performed by the UE self-contained uplink manager as described herein. In some examples, the UE 115 may execute a set of codes to control the functional elements of the device to perform the functions described below. Additionally or alternatively, the UE 115 may perform aspects the functions described below using special-purpose hardware.

At block 1605, the UE 115 may receive an uplink resource allocation that is associated with a two-symbol TTI as described above with reference to FIGS. 2 through 6. In certain examples, the operations of block 1605 may be performed by the uplink resource allocation component as described with reference to FIGS. 9 and 10.

At block 1610, the UE 115 may determine whether a DM-RS is scheduled to be transmitted in one symbol of the two-symbol TTI as part of the uplink resource allocation as described above with reference to FIGS. 2 through 6. In certain examples, the operations of block 1610 may be performed by the DM-RS component as described with reference to FIGS. 9 and 10.

At block 1615, the UE 115 may transmit data or the DM-RS, or both, during the two-symbol TTI based on the determination of whether the DM-RS is scheduled as described above with reference to FIGS. 2 through 6. In certain examples, the operations of block 1615 may be performed by the DM-RS based transmission component as described with reference to FIGS. 9 and 10.

Figure 17:
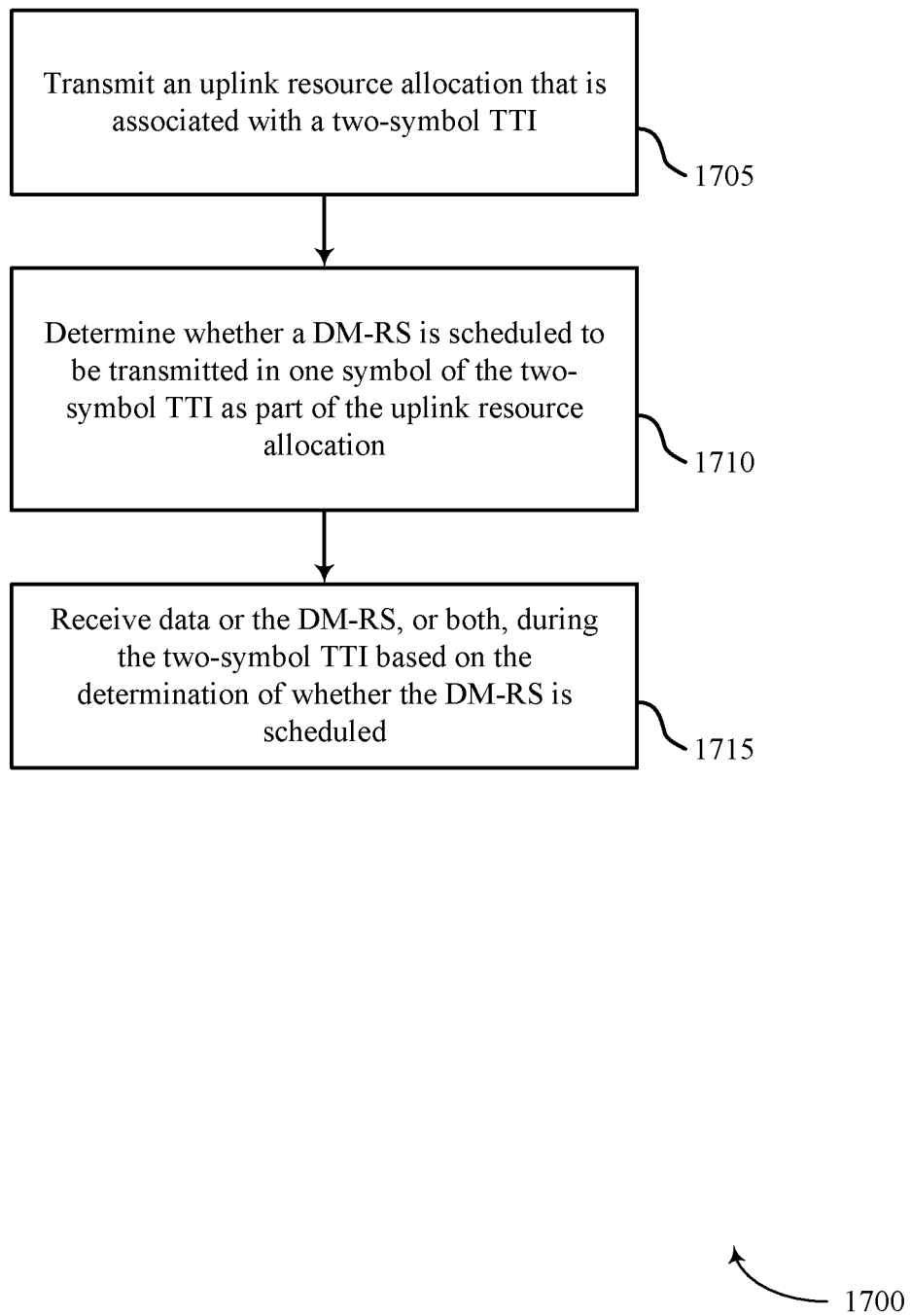

FIG. 17 shows a flowchart illustrating a method 1700 for self-contained uplink for reduced duration TTIs in accordance with various aspects of the present disclosure. The operations of method 1700 may be implemented by a device such as a base station 105 or its components as described with reference to FIGS. 1 and 2. For example, the operations of method 1700 may be performed by the base station self-contained uplink manager as described herein. In some examples, the base station 105 may execute a set of codes to control the functional elements of the device to perform the functions described below. Additionally or alternatively, the base station 105 may perform aspects the functions described below using special-purpose hardware.

At block 1705, the base station 105 may transmit an uplink resource allocation that is associated with a two-symbol TTI as described above with reference to FIGS. 2 through 6. In certain examples, the operations of block 1705 may be performed by the uplink resource allocation component as described with reference to FIGS. 13 and 14.

At block 1710, the base station 105 may determine whether a DM-RS is scheduled to be transmitted in one symbol of the two-symbol TTI as part of the uplink resource allocation as described above with reference to FIGS. 2 through 6. In certain examples, the operations of block 1710 may be performed by the DM-RS component as described with reference to FIGS. 13 and 14.

At block 1715, the base station 105 may receive data or the DM-RS, or both, during the two-symbol TTI based on the determination of whether the DM-RS is scheduled as described above with reference to FIGS. 2 through 6. In certain examples, the operations of block 1715 may be performed by the DM-RS based reception component as described with reference to FIGS. 13 and 14.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for self-contained uplink for reduced duration TTIs.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different (physical) locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers (CCs)). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 and 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Thus, aspects of the disclosure may provide for self-contained uplink for reduced duration TTIs. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," "component", and the like may not be a substitute for the word "means." As such, no claim element is to be construed as a means plus function unless the element is expressly recited using the phrase "means for."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method of wireless communication comprising:
receiving an uplink grant that schedules data during an uplink resource allocation comprising a two-symbol transmission time interval (TTI), the uplink grant comprising an indication of a number of symbol periods between one symbol of the TTI scheduled for a demodulation reference signal (DM-RS) and a subsequent two-symbol TTI scheduled for data;
determining, based at least in part on the uplink grant that schedules the data, that the DM-RS is scheduled to be transmitted in the one symbol of the two-symbol TTI; and
transmitting the DM-RS in the one symbol of the two-symbol TTI and data in the subsequent two-symbol TTI according to the uplink grant.

2. The method of claim 1,
wherein the subsequent two-symbol TTI excludes another DM-RS.

3. The method of claim 1, wherein the number of symbol periods between the one symbol scheduled for the DM-RS and the subsequent two-symbol TTI comprises an odd number.

4. The method of claim 1, wherein the transmitting comprises:
transmitting data in a second symbol of the two-symbol TTI.

5. The method of claim 1, wherein the uplink grant is received in a downlink control channel in a two-symbol TTI that precedes the TTI scheduled for the DM-RS.

6. The method of claim 1, wherein the uplink grant is received in a downlink control channel during a TTI that has a longer duration than the two-symbol TTI.

7. The method of claim 1, wherein the two-symbol TTI comprises the smallest scheduling unit for communications between a user equipment (UE) and a base station.

8. The method of claim 1, wherein the one symbol of the two-symbol TTI comprises DM-RS transmissions from two or more user equipments (UEs).

9. A method of wireless communication comprising:
transmitting an uplink grant that schedules data during an uplink resource allocation comprising a two-symbol transmission time interval (TTI), the uplink grant indicating that a demodulation reference signal (DM-RS) is scheduled to be transmitted in one symbol of the two-symbol TTI and comprising an indication of a number of symbol periods between the one symbol scheduled for the DM-RS and a subsequent two-symbol TTI scheduled for data;
determining that a DM-RS is scheduled to be transmitted in the one symbol of the two-symbol TTI; and
receiving the DM-RS in the one symbol of the two-symbol TTI based at least in part on the determination that the DM-RS is scheduled and data in the subsequent two-symbol TTI based at least in part on the number of symbol periods indicated in the uplink grant.

10. The method of claim 9,
wherein the subsequent two-symbol TTI excludes another DM-RS.

11. The method of claim 9, wherein the receiving comprises:
receiving data in a second symbol of the two-symbol TTI.

12. The method of claim 9, wherein the receiving comprises:
receiving the DM-RS in a leading symbol of the two-symbol TTI, wherein the DM-RS is associated with a first user equipment (UE); and
receiving another DM-RS in the leading symbol of the two-symbol TTI, wherein the other DM-RS is associated with a second UE.

13. The method of claim 12, further comprising:
receiving data from the second UE in a second symbol of the two-symbol TTI, wherein the
subsequent two-symbol TTI that excludes another DM-RS.

14. An apparatus for wireless communication, comprising:
a processor;
memory in electronic communication with the processor; and
instructions stored in the memory and operable, when executed by the processor, to cause the apparatus to:
receive an uplink grant that schedules data during an uplink resource allocation comprising a two-symbol transmission time interval (TTI), the uplink grant comprising an indication of a number of symbol periods between one symbol of the TTI scheduled for a demodulation reference signal (DM-RS) and a subsequent two-symbol TTI scheduled for data;

determine, based at least in part on the uplink grant that schedules the data, that the DM-RS is scheduled to be transmitted in the one symbol of the two-symbol TTI; and transmit the DM-RS in the one symbol of the two-symbol TTI and data in the subsequent two-symbol TTI according to the uplink grant.

15. The apparatus of claim 14, wherein the subsequent two-symbol TTI excludes another DM-RS.

16. The apparatus of claim 14, wherein the number of symbol periods between the one symbol scheduled for the DM-RS and the subsequent two-symbol TTI comprises an odd number.

17. The apparatus of claim 14, wherein the instructions executable by the processor to cause the apparatus to transmit the DM-RS and data are executable by the processor to cause the apparatus to:
transmit the data in a second symbol of the two-symbol TTI.

18. The apparatus of claim 14, wherein the uplink grant is received in a downlink control channel in a two-symbol TTI that precedes the TTI scheduled for the DM-RS.

19. The apparatus of claim 14, wherein the uplink grant is received in a downlink control channel in a TTI that has a longer duration than the two-symbol TTI.

20. The apparatus of claim 14, wherein the one symbol of the two-symbol TTI comprises DM-RS transmissions from two or more user equipments (UEs).

21. An apparatus for wireless communication, comprising:
a processor;
memory in electronic communication with the processor; and
instructions stored in the memory and operable, when executed by the processor, to cause the apparatus to:
transmit an uplink grant that schedules data during an uplink resource allocation comprising a two-symbol transmission time interval (TTI), the uplink grant indicating that a demodulation reference signal (DM-RS) is scheduled to be transmitted in one symbol of the two-symbol TTI and comprising an indication of a number of symbol periods between the one symbol scheduled for the DM-RS and a subsequent two-symbol TTI scheduled for data;
determine that a DM-RS is scheduled to be transmitted in the one symbol of the two-symbol TTI; and
receive the DM-RS in the one symbol of the two-symbol TTI based at least in part on the determination that the DM-RS is scheduled and data in the subsequent two-symbol TTI based at least in part on the number of symbol periods indicated in the uplink grant.

22. The apparatus of claim 21, wherein the subsequent two-symbol TTI excludes another DM-RS.

23. The apparatus of claim 21, wherein the instructions executable by the processor to cause the apparatus to receive the DM-RS and data are executable by the processor to cause the apparatus to:
receive the data during a second symbol of the two-symbol TTI.

24. The apparatus of claim 21, wherein the instructions executable by the processor to cause the apparatus to receive the DM-RS and data are executable by the processor to cause the apparatus to:
receive the DM-RS in a leading symbol of the two-symbol TTI, wherein the DM-RS is associated with a first user equipment (UE); and
receive another DM-RS in the leading symbol of the two-symbol TTI, wherein the other DM-RS is associated with a second UE.

25. The apparatus of claim 24, wherein the instructions are executable by the processor to cause the apparatus to:
receive data from the second UE during a second symbol of the two-symbol wherein the
subsequent two-symbol TTI that excludes another DM-RS.

* * * * *